US011003417B2

(12) United States Patent
Choi et al.

(10) Patent No.: US 11,003,417 B2
(45) Date of Patent: May 11, 2021

(54) SPEECH RECOGNITION METHOD AND APPARATUS WITH ACTIVATION WORD BASED ON OPERATING ENVIRONMENT OF THE APPARATUS

(71) Applicant: Samsung Electronics Co., Ltd., Suwon-si (KR)

(72) Inventors: Sung-ja Choi, Seoul (KR); Eun-kyoung Kim, Suwon-si (KR); Ji-sang Yu, Seoul (KR); Ji-yeon Hong, Anyang-si (KR); Jong-youb Ryu, Hwaseong-si (KR); Jae-won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/783,476

(22) Filed: Oct. 13, 2017

(65) Prior Publication Data

US 2018/0173494 A1    Jun. 21, 2018

(30) Foreign Application Priority Data

Dec. 15, 2016  (KR) ................. 10-2016-0171670
Apr. 27, 2017  (KR) ................. 10-2017-0054513

(51) Int. Cl.
*G06F 3/16* (2006.01)
*G10L 15/22* (2006.01)
(Continued)

(52) U.S. Cl.
CPC ............. *G06F 3/167* (2013.01); *G06N 20/00* (2019.01); *G10L 15/08* (2013.01); *G10L 15/22* (2013.01);
(Continued)

(58) Field of Classification Search
CPC ......... G06F 3/167; G06F 15/18; G10L 15/08; G10L 15/22; G10L 15/26; G10L 15/30; G10L 17/24; G10L 2015/228
See application file for complete search history.

(56) References Cited

U.S. PATENT DOCUMENTS 5,758,320 A  *  5/1998  Asano .................... G10L 13/08
                                                         704/258
5,799,279 A  *  8/1998  Gould .................... G10L 15/26
                                                         704/275
(Continued)

FOREIGN PATENT DOCUMENTS

JP      03-145700 A        6/1991
KR   10-2016-0010961 A     1/2016

OTHER PUBLICATIONS

Extended European Search Report dated Nov. 18, 2019, issued in European Application No. 17879966.4.
(Continued)

*Primary Examiner* — Fariba Sirjani
(74) *Attorney, Agent, or Firm* — Jefferson IP Law, LLP

(57) ABSTRACT

A speech recognition method and apparatus for performing speech recognition in response to an activation word determined based on a situation are provided. The speech recognition method and apparatus include an artificial intelligence (AI) system and its application, which simulates functions such as recognition and judgment of a human brain using a machine learning algorithm such as deep learning.

14 Claims, 14 Drawing Sheets

(51) Int. Cl.
  *G10L 15/26* (2006.01)
  *G10L 15/08* (2006.01)
  *G10L 17/24* (2013.01)
  *G10L 15/30* (2013.01)
  *G06N 20/00* (2019.01)

(52) U.S. Cl.
  CPC .............. *G10L 15/26* (2013.01); *G10L 15/30* (2013.01); *G10L 17/24* (2013.01); *G10L 2015/228* (2013.01)

(56) References Cited

U.S. PATENT DOCUMENTS

| | | | | |
|---|---|---|---|---|
| 5,930,751 | A * | 7/1999 | Cohrs | G10L 15/22 704/231 |
| 8,275,617 | B1 * | 9/2012 | Morgan | G10L 15/22 704/251 |
| 8,924,219 | B1 | 12/2014 | Bringert et al. | |
| 9,263,035 | B2 | 2/2016 | Sharifi | |
| 9,412,360 | B2 * | 8/2016 | Byrne | G10L 15/22 |
| 9,542,941 | B1 * | 1/2017 | Weksler | G10L 15/22 |
| 9,691,384 | B1 * | 6/2017 | Wang | G10L 17/22 |
| 9,697,828 | B1 * | 7/2017 | Prasad | G10L 15/08 |
| 9,711,143 | B2 * | 7/2017 | Kennewick | G10L 15/1822 |
| 10,706,844 | B2 * | 7/2020 | Ogawa | G06F 1/1694 |
| 2007/0050191 | A1 * | 3/2007 | Weider | G10L 15/22 704/275 |
| 2009/0327263 | A1 * | 12/2009 | Maghoul | G06F 16/3329 |
| 2012/0289217 | A1 * | 11/2012 | Riemer | H04M 1/72577 455/418 |
| 2012/0303267 | A1 * | 11/2012 | Shen | G10L 15/1815 701/427 |
| 2013/0085757 | A1 * | 4/2013 | Nakamura | G10L 15/22 704/254 |
| 2013/0096771 | A1 * | 4/2013 | Srenger | B60K 37/06 701/36 |
| 2013/0096921 | A1 * | 4/2013 | Kuwamoto | G08G 1/0962 704/260 |
| 2013/0132095 | A1 * | 5/2013 | Murthi | G06F 1/3234 704/275 |
| 2013/0143527 | A1 * | 6/2013 | Randazzo | H04W 48/04 455/411 |
| 2013/0166293 | A1 | 6/2013 | Melamed et al. | |
| 2014/0214429 | A1 * | 7/2014 | Pantel | G10L 15/32 704/275 |
| 2014/0229185 | A1 * | 8/2014 | Byrne | G10L 15/22 704/275 |
| 2014/0324431 | A1 * | 10/2014 | Teasley | G10L 15/22 704/246 |
| 2014/0350924 | A1 | 11/2014 | Zurek et al. | |
| 2015/0106085 | A1 * | 4/2015 | Lindahl | G10L 15/32 704/231 |
| 2015/0161990 | A1 | 6/2015 | Sharifi | |
| 2015/0244807 | A1 * | 8/2015 | Shoemake | H04L 67/125 709/202 |
| 2015/0348548 | A1 * | 12/2015 | Piernot | G10L 15/22 704/235 |
| 2016/0019887 | A1 | 1/2016 | Kim et al. | |
| 2016/0217785 | A1 * | 7/2016 | Kennewick | G10L 15/1822 |
| 2016/0267913 | A1 * | 9/2016 | Kim | G10L 15/22 |
| 2016/0379632 | A1 * | 12/2016 | Hoffmeister | G10L 15/26 704/253 |
| 2017/0053650 | A1 * | 2/2017 | Ogawa | G10L 15/063 |
| 2017/0110130 | A1 * | 4/2017 | Sharifi | G06F 21/32 |
| 2017/0200455 | A1 * | 7/2017 | Aggarwal | G10L 15/22 |
| 2017/0213559 | A1 * | 7/2017 | Agrawal | G10L 15/22 |
| 2018/0108343 | A1 * | 4/2018 | Stevans | G10L 13/043 |
| 2018/0137861 | A1 * | 5/2018 | Ogawa | G06F 1/1694 |

OTHER PUBLICATIONS

Indian Office Action dated Mar. 27, 2021, issued in Indian Patent Application No. 201927026263.

* cited by examiner

SPEECH RECOGNITION METHOD AND APPARATUS WITH ACTIVATION WORD BASED ON OPERATING ENVIRONMENT OF THE APPARATUS

CROSS-REFERENCE TO RELATED APPLICATION(S)

This application claims the benefit under 35 U.S.C. § 119(a) of a Korean patent application filed on Dec. 15, 2016 in the Korean Intellectual Property Office and assigned Serial number 10-2016-0171670, and of a Korean patent application filed on Apr. 27, 2017 in the Korean Intellectual Property Office and assigned Serial number 10-2017-0054513, the entire disclosure of each which is hereby incorporated by reference.

TECHNICAL FIELD

The present disclosure relates to an artificial intelligence (AI) system and its application, which simulates functions such as recognition and judgment of a human brain using a machine learning algorithm such as deep learning.

The present disclosure relates to a speech recognition method and apparatus. More particularly, the present disclosure relates to a speech recognition method and apparatus for performing speech recognition in response to an activation word determined based on information related to a situation in which the speech recognition apparatus operates.

BACKGROUND

An artificial intelligence (AI) system is a computer system that implements human-level intelligence. Unlike an existing rule-based smart system, the AI system is a system that machine learns, judges and becomes smart autonomously. The more the AI system is used, the more the recognition rate may be improved and the more accurately the user preference may be understood, and thus the existing rule-based smart system is gradually being replaced by a deep-learning-based AI system.

AI technology consists of machine learning (deep learning) and element technologies that utilize the machine learning. Machine learning is an algorithm-based technology that classifies/learns characteristics of input data autonomously. Element technology is a technology that simulates functions of the human brain such as recognition and judgment using machine learning algorithms such as deep learning, and consists of technical fields such as linguistic understanding, visual understanding, inference/prediction, knowledge representation, and motion control, etc.

AI technology may be applied various fields. Linguistic understanding is a technology for recognizing, applying, and processing human language/characters, including natural language processing, machine translation, dialogue system, query response, speech recognition/synthesis, and the like. Visual understanding is a technique to recognize and process objects as performed in human vision, including object recognition, object tracking, image search, human recognition, scene understanding, spatial understanding, and image enhancement. Inference/prediction is a technique for judging and logically inferring and predicting information, including knowledge/probability based inference, optimization prediction, preference based planning, recommendation, etc. Knowledge representation is a technology for automating human experience information into knowledge data, including knowledge building (data generation/classification) and knowledge management (data utilization). Motion control is a technique for controlling autonomous travel of a vehicle and a motion of a robot, including movement control (navigation, collision-avoidance, traveling), operation control (behavior control), and the like.

As electronic devices that perform various functions in a complex manner such as smart phones have been developed, electronic devices equipped with a speech recognition function are being introduced. The speech recognition function has an advantage in that a user may easily control a device by recognizing speech of the user without depending on an operation of a separate button or a contact of a touch module.

According to the speech recognition function, for example, a portable terminal such as a smart phone may perform a call function or text messaging without pressing a button, and may easily set various functions such as a route search, an Internet search, an alarm setting, etc.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method that may control a speech recognition apparatus by speaking as a user naturally interacts with the speech recognition apparatus, thereby enhancing convenience for the user.

Additional aspects will be set forth in part in the description which follows and, in part, will be apparent from the description, or may be learned by practice of the presented embodiments.

In accordance with an aspect of the present disclosure, a speech recognition method is provided. The method includes determining at least one activation word based on information related to a situation in which a speech recognition apparatus operates, receiving an input audio signal, performing speech recognition on the input audio signal, based on whether a speech signal for uttering an activation word included in the at least one activation word has been included in the input audio signal, and outputting a result of the performing of the speech recognition.

In accordance with another aspect of the present disclosure, a speech recognition apparatus is provided. The apparatus includes a receiver configured to receive an input audio signal, at least one processor configured to determine at least one activation word based on information related to a situation in which a speech recognition apparatus operates and perform speech recognition on the input audio signal, based on whether a speech signal for uttering an activation word included in the at least one activation word has been included in the input audio signal, and an outputter configured to output a result of the speech recognition.

In accordance with another aspect of the present disclosure, a non-transitory computer-readable recording medium is provided. The non-transitory computer-readable recording medium having recorded thereon at least one program includes instructions for allowing a speech recognition apparatus to execute a speech recognition method. The speech recognition method includes determining at least one activation word based on information related to a situation in which a speech recognition apparatus operates, receiving an input audio signal, performing speech recognition on the input audio signal, based on whether a speech signal for uttering an activation word included in the at least one activation word has been included in the input audio signal, and outputting a result of the performing of the speech recognition.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure may be represented by functional block configurations and various processing operations. Some or all of these functional blocks may be implemented with various numbers of hardware and/or software configurations that perform particular functions. For example, the functional blocks of the present disclosure may be implemented by one or more microprocessors, or by circuit configurations for a given function. Also, the functional blocks of the present disclosure may be implemented in various programming or scripting languages. The functional blocks may be implemented with algorithms running on one or more processors. The present disclosure may also employ techniques for electronic configuration, signal processing, and/or data processing, and the like according to the related art.

Connection lines or connection members between the components shown in the figures are merely illustrative of functional connections and/or physical or circuit connections. In actual devices, connections between components may be represented by various functional connections, physical connections, or circuit connections that may be replaced or added.

The present disclosure will be described in detail with reference to the accompanying drawings.

Figure 1A:
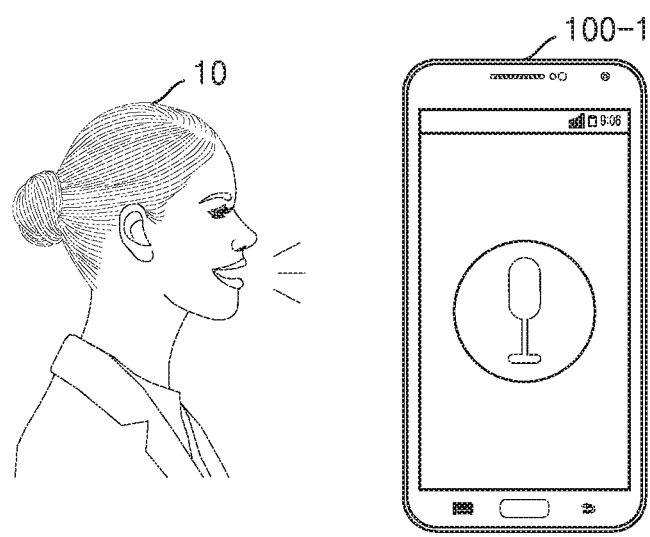
FIGS. 1A, 1B, and 1C are views for explaining a speech recognition system according to an embodiment of the present disclosure.
Figure 1B:
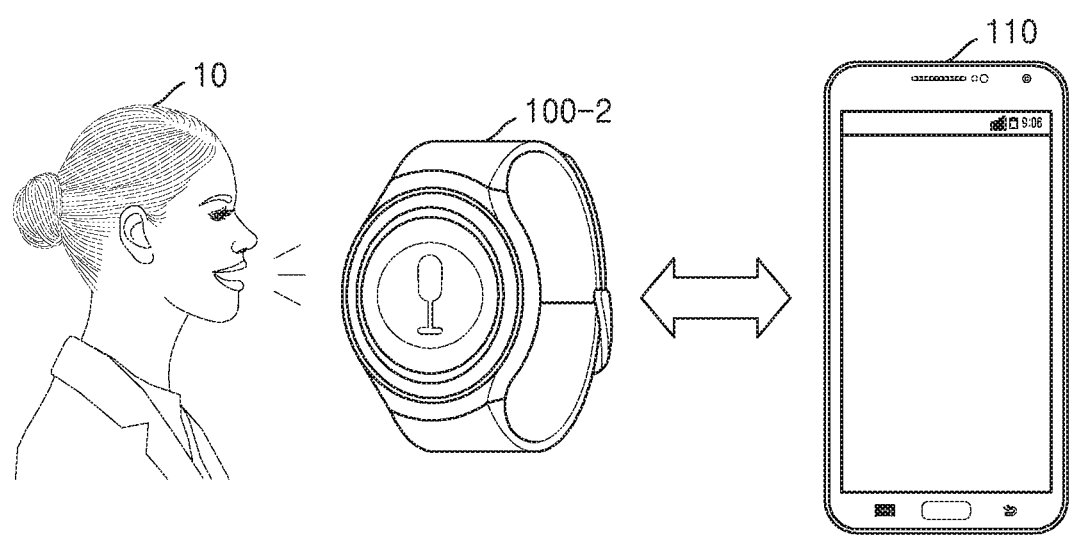
Figure 1C:
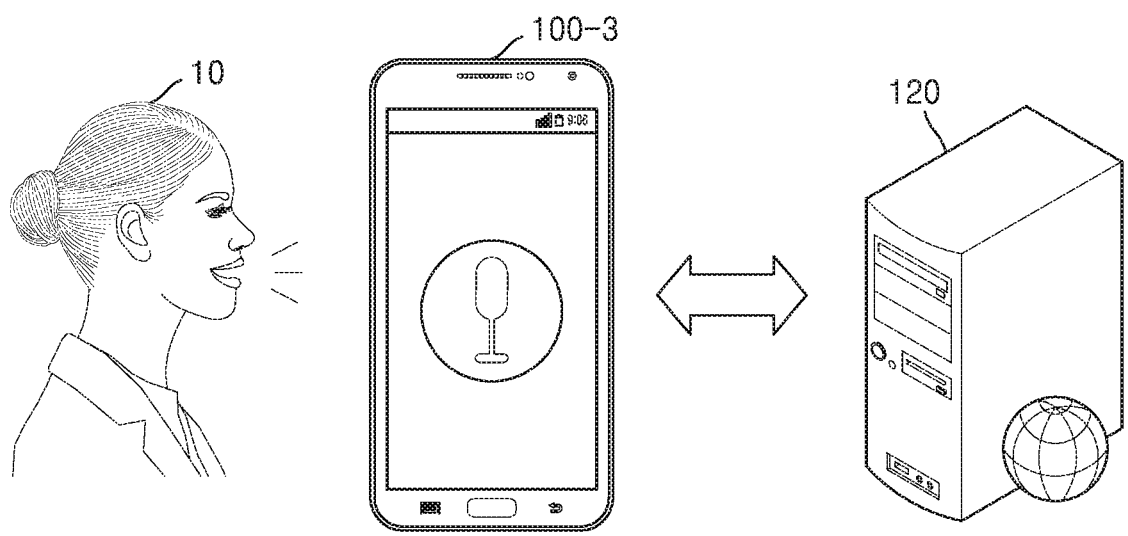

FIGS. 1A, 1B, and 1C are views for explaining a speech recognition system according to an embodiment of the present disclosure.

Referring to FIGS. 1A-1C, the speech recognition system may be a deep learning based artificial intelligence (AI) system. The speech recognition system may use artificial intelligence technology to infer and predict a situation in which the speech recognition apparatus operates, and may recognize, apply, and process a human language.

Referring to FIG. 1A, the speech recognition system may include a speech recognition apparatus 100-1. For example, the speech recognition apparatus 100-1 may be a mobile computing apparatus such as a smart phone, a tablet personal computer (PC), a PC, a smart television (TV), a personal digital assistant (PDA), a laptop, a media player, a micro server, a global positioning system (GPS), an e-book reader, a digital broadcasting terminal, a navigation device, a kiosk, an Moving Picture Experts Group phase 1 or phase 2 (MPEG-1 or MPEG-2) audio layer 3 (MP3) player, a digital camera, an electronic control device of a vehicle, a central information display (CID), etc. or a non-mobile computing apparatus but is not limited thereto. The speech recognition apparatus 100-1 may receive an audio signal including a speech signal uttered by a user 10 and perform speech recognition on the speech signal. The speech recognition apparatus 100-1 may output a speech recognition result.

Referring to FIG. 1B, the speech recognition system may include a speech recognition apparatus 100-2 and an electronic apparatus 110 connected to the speech recognition apparatus 100-2. The speech recognition apparatus 100-2 and the electronic apparatus 110 may be connected by wires or wirelessly. For example, the electronic apparatus 110 coupled to the speech recognition apparatus 100-2 may be a mobile computing apparatus such as a smart phone, a tablet PC, a PC, a smart TV, an electronic control device of a vehicle, a CID, or a non-mobile computing apparatus. The speech recognition apparatus 100-2 may be, but is not limited to, a wearable device, a smart phone, a tablet PC, a PC, a navigation system, or a smart TV, which cooperates with the electronic apparatus 110.

The speech recognition apparatus 100-2 may receive an audio signal including a speech signal uttered by the user 10 and transmit the inputted audio signal to the electronic apparatus 110. The speech recognition apparatus 100-2 may receive an audio signal including a speech signal uttered by the user 10, and may transmit the detected speech signal from the input audio signal to the electronic apparatus 110. The speech recognition apparatus 100-2 may receive an audio signal including the speech signal uttered by the user 10, and transmit a characteristic of the speech signal detected from the input audio signal to the electronic apparatus 110.

The electronic apparatus 110 may perform speech recognition based on a signal received from the speech recognition apparatus 100-2. For example, the electronic apparatus 110 may perform speech recognition on the speech signal detected from the audio signal input from the speech recognition apparatus 100-2. The electronic apparatus 110 may output a speech recognition result or send the speech recognition result to the speech recognition apparatus 100-2 so that the speech recognition apparatus 100-2 outputs the speech recognition result.

Referring to FIG. 1C, the speech recognition system may include a speech recognition apparatus 100-3 and a server 120 connected to the speech recognition apparatus 100-3. The speech recognition apparatus 100-3 and the server 120 may be connected by wired or wirelessly.

The speech recognition apparatus 100-3 may receive an audio signal including a speech signal uttered by the user 10 and transmit the inputted audio signal to the server 120. The speech recognition apparatus 100-3 may also receive an audio signal including a speech signal uttered by the user 10, and may transmit the detected speech signal from the input audio signal to the server 120. The speech recognition apparatus 100-3 may also receive an audio signal including the speech signal uttered by the user 10, and transmit a characteristic of the detected speech signal from the input audio signal to the server 120.

The server 120 may perform speech recognition based on the signal received from the speech recognition apparatus 100-3. For example, the server 120 may perform speech recognition on the speech signal detected from the audio signal input from the speech recognition apparatus 100-3. The server 120 may transmit the speech recognition result to the speech recognition apparatus 100-3 so that the speech recognition apparatus 100-3 outputs the speech recognition result.

The speech recognition system shown in FIGS. 1A, 1B, and 1C has an advantage in that a user may easily control an apparatus by recognizing the user's speech.

However, when a speech recognition apparatus continuously activates a speech recognition function, since it is difficult for the speech recognition apparatus to distinguish whether an input audio signal is speech that is an object of speech recognition or noise that is not the object of speech recognition, the recognition performance deteriorates. Further, if the speech recognition apparatus continues a speech detection operation and a speech recognition operation, the speech recognition apparatus may unnecessarily consume power or memory capacity.

Therefore, the speech recognition apparatus should be capable of activating the speech recognition function only when the user utters a speech command.

As an example, a speech recognition apparatus according to the related art uses a method of activating the speech recognition function when the user presses a button. This activation method has a disadvantage that the user must be located within a certain physical distance from the speech recognition apparatus and that the user should be careful not to press the button when the activation of the speech recognition function is not desired.

As another example, the speech recognition apparatus according to the related art uses a method of activating the speech recognition function when a predetermined specific activation word is uttered. This activation method has a disadvantage in that it is unnatural that the user must utter the specific activation word before uttering a speech command.

As described above, the speech recognition apparatus requires an active action of the user in order to activate the speech recognition function according to the related art. Accordingly, since the speech recognition function may not be started when the active action of the user is not involved, the speech recognition apparatus has a limitation in providing a proactive service through speech recognition.

Accordingly, the speech recognition apparatus according to embodiments of the present disclosure provides a method of enhancing the convenience of the user by enabling the user to control the speech recognition apparatus by speaking as if the user naturally interacts with the speech recognition apparatus. The speech recognition apparatus may provide a proactive service even when there is no direct operation of the user. An embodiment provides a method of activating a speech recognition function based on a plurality of activation words designated according to a situation in which the speech recognition apparatus operates. In addition, an embodiment provides a method in which a speech recognition apparatus operates before performing speech recognition.

Figure 2A:
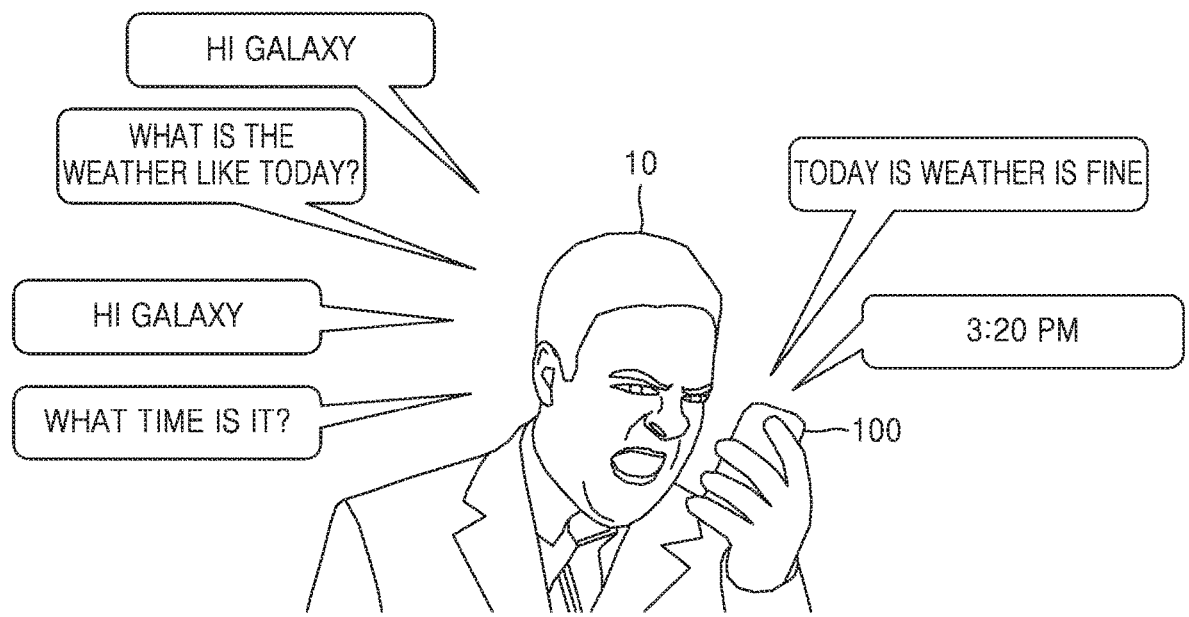
FIG. 2A is a diagram of an operation method of a general speech recognition apparatus according to an embodiment of the present disclosure.

FIG. 2A is a diagram of an operation method of a general speech recognition apparatus according to an embodiment of the present disclosure.

Referring to FIG. 2A, an example is illustrated in which the general speech recognition apparatus 100 activates a speech recognition function when one specific activation word "Hi Galaxy" is uttered.

As shown in FIG. 2A, a user 10 has to utter the activation word "Hi Galaxy" prior to a speech command to ask for today's weather.

The speech recognition apparatus 100 may activate a speech recognition function when a speech signal for uttering the activation word "Hi Galaxy" is received. The speech recognition apparatus 100 may perform speech recognition on a speech command of the user "What is the weather like today?" which is a sentence to be uttered after the activation word, and may provide weather information "Today's weather is fine" as a response to the speech command of the user.

Next, the user 10 should utter the activation word "Hi Galaxy" prior to a speech command to ask for the current time.

The speech recognition apparatus 100 may activate the speech recognition function when a speech signal for uttering the activation word "Hi Galaxy" is received. The speech recognition apparatus 100 may perform speech recognition on the speech command of the user "What time is it?" which is a sentence to be uttered after the activation word and may provide time information "3:20 pm" as a response to the speech command of the user.

As shown in FIG. 2A, when the speech recognition function is activated using only a designated activation word, it is cumbersome and unnatural for the user to utter the activation word each time.

Therefore, according to an embodiment of the present invention, a speech recognition apparatus may perform speech recognition with respect to a speech command that a user naturally utters, without requiring the user to utter a separate activation word or activate a speech recognition function.

Figure 2B:
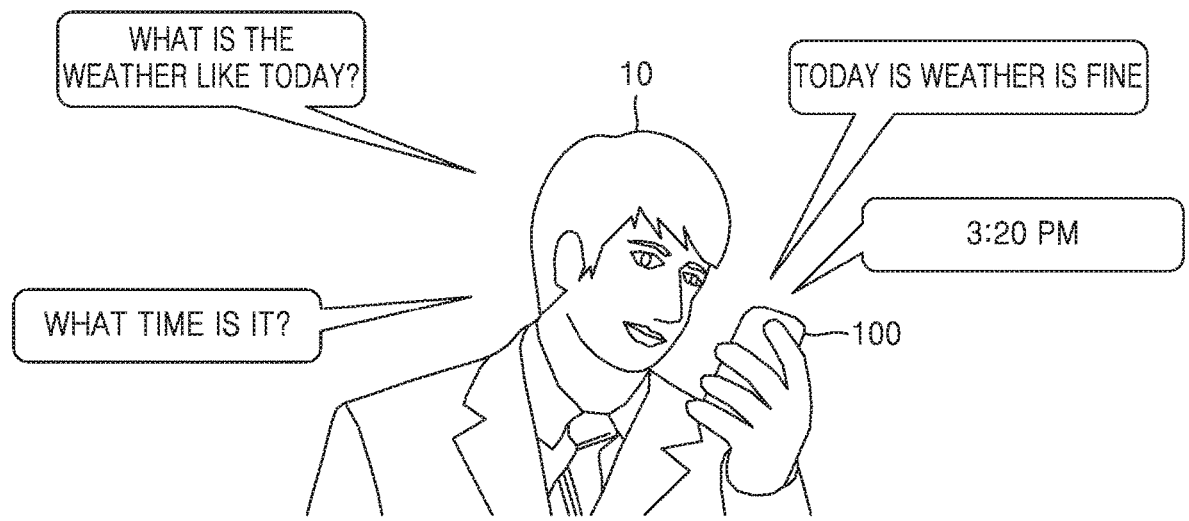
FIG. 2B is a diagram of an operation method of a speech recognition apparatus according to an embodiment of the present disclosure.

FIG. 2B is a diagram of an operation method of a speech recognition apparatus according to an embodiment of the present disclosure.

Referring to FIG. 2B, the user 10 may utter a speech command "What is the weather like today?" that is a speech command to ask for today's weather without any separate activation operation in order to ask for today's weather. The speech recognition apparatus 100 may activate a speech recognition function when a speech signal for uttering the speech command "What is the weather like today?" is received. The speech recognition apparatus 100 may perform speech recognition on the speech command of the user "What is the weather like today?" and may provide weather information "Today's weather is fine" as a response to the speech command of the user.

Next, the user 10 may utter "What time is it now?" that is a speech command to ask for the current time without a separate activation operation in order to ask for the current time. The speech recognition apparatus 100 may activate the speech recognition function when a speech signal for uttering the speech command "What time is it now?" is received. The speech recognition apparatus 100 may perform speech recognition with respect to the speech command of the user "What time is it?" and provide time information "3:20 pm" as a response to the speech command of the user.

A specific method of performing a speech recognition method by a speech recognition apparatus according to an embodiment of the present disclosure is described below. However, as shown in FIGS. 1A, 1B, and 1C, a speech recognition system may include at least one speech recognition apparatus and may further include a server or an electronic device. Hereinafter, for the convenience of explanation, the speech recognition method performed in the "speech recognition apparatus" will be described. However, some or all of operations of the speech recognition apparatus described below may also be performed by the server and may be partially performed by a plurality of electronic apparatuses.

Figure 3:
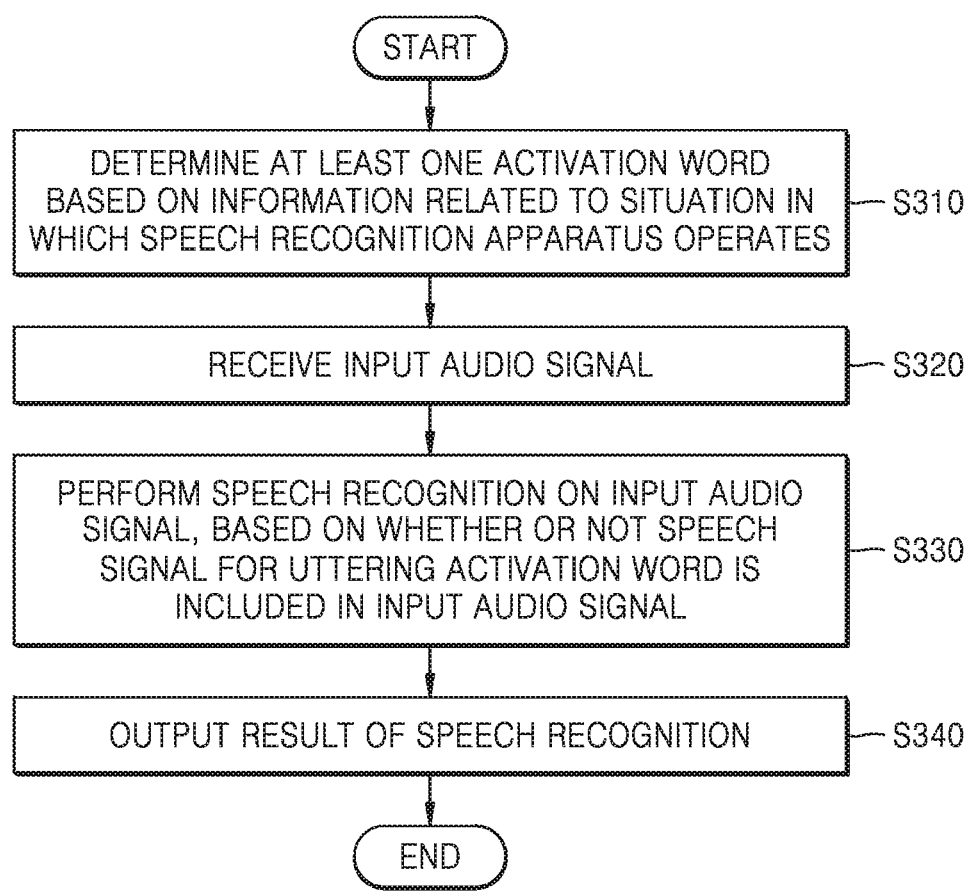
FIG. 3 is a flowchart of a method of performing speech recognition by a speech recognition apparatus according to an embodiment of the present disclosure.

FIG. 3 is a flowchart of a method of performing speech recognition by a speech recognition apparatus according to an embodiment of the present disclosure.

Referring to FIG. 3, in operation S310, the speech recognition apparatus 100 according to an embodiment may determine at least one activation word based on information related to a situation in which the speech recognition apparatus 100 operates. The speech recognition apparatus 100 according to an embodiment may utilize an artificial intelligence technology to infer and predict the situation in which the speech recognition apparatus 100 operates and to determine at least one activation word.

The information related to the situation may include at least one of information related to a location and time of the speech recognition apparatus 100, whether or not the speech recognition apparatus 100 is connected to another electronic apparatus, a type of a network to which the speech recognition apparatus 100 is connected, and a characteristic of a user using the speech recognition apparatus 100.

As an example, the speech recognition apparatus 100 may obtain information about at least one electronic apparatus connected to the speech recognition apparatus 100. The speech recognition apparatus 100 may determine a word associated with the at least one electronic device as at least one activation word. As another example, the speech recognition apparatus 100 may acquire information about the network to which the speech recognition apparatus 100 is connected. The speech recognition apparatus 100 may identify the situation in which the speech recognition apparatus 100 operates based on the information about the network to which the speech recognition apparatus 100 is connected. For example, the speech recognition apparatus 100 may determine a location where the speech recognition apparatus 100 operates based on the information about the network to which the speech recognition apparatus 100 is connected.

For example, when the speech recognition apparatus 100 connects to a Wi-Fi network installed in a house, the speech recognition apparatus 100 may determine that the location of the speech recognition apparatus 100 is in the house. The speech recognition apparatus 100 may determine at least one activation word corresponding to the house. The speech recognition apparatus 100 may determine a TV, an air conditioner, a cleaner, weather, a schedule, etc. as activation words corresponding to the house.

The speech recognition apparatus 100 may further include storing a plurality of candidate activation words corresponding to a plurality of situations respectively prior to determining the at least one activation word. The speech recognition apparatus 100 may acquire information related to the situation in which the speech recognition apparatus 100 operates and retrieve stored data so that the at least one candidate activation word corresponding to the situation in which the speech recognition apparatus 100 operates may be extracted. The speech recognition apparatus 100 may determine the at least one candidate activation word as the at least one activation word.

The speech recognition apparatus 100 may receive information on speech commands that the speech recognition apparatus 100 receives from the user in a plurality of situations to store the plurality of candidate activation words. The speech recognition apparatus 100 may extract a plurality of words included in the speech commands. The speech recognition apparatus 100 may store at least one word as a candidate activation word corresponding to a specific situation, based on a frequency with which the plurality of words are included in the speech commands received in a specific situation among the plurality of situations.

The speech recognition apparatus 100 may determine the number of at least one activation words determined based on a degree to which the speech recognition function of the speech recognition apparatus 100 is sensitively activated.

For example, the degree to which the speech recognition function of the speech recognition apparatus 100 is sensitively activated may mean at least one of a speed at which the speech recognition apparatus 100 is activated in response to various speech signals, a difficulty level at which the speech recognition apparatus 100 is activated, and the frequency with which the speech recognition apparatus 100 is activated. For example, when the speech recognition apparatus 100 is activated at a high frequency in response to various speech signals, it may be determined that the speech recognition function of the speech recognition apparatus 100 is activated sensitively. It may be determined that the speech recognition function of the speech recognition apparatus 100 is activated less sensitively when the speech recognition apparatus 100 is activated at a relatively low frequency in response to various speech signals.

The degree to which the speech recognition function is sensitively activated may be determined based on a user input or may be determined based on the location of the speech recognition apparatus 100. For example, when the speech recognition apparatus 100 is located in a private space such as a house, it may be determined that the speech recognition function is sensitively activated, and when the speech recognition apparatus 100 is located in a public space such as a company, it may be determined that the speech recognition function is activated less sensitively. For example, when the speech recognition apparatus 100 is located in a private space such as the house, it may be determined that the speech recognition function is activated at a high frequency, and when the speech recognition apparatus 100 is located in the public space such as the company, it may be determined that the speech recognition function is activated at a relatively low frequency.

In operation S320, the speech recognition apparatus 100 may receive the input audio signal. For example, the speech recognition apparatus 100 may divide an input audio signal input in real time in a frame unit of a predetermined length and process the input audio signals divided in the frame unit. A speech signal in the frame unit may be detected from the input audio signal divided in the frame unit.

The speech recognition apparatus 100 according to an embodiment may receive and store the input audio signal. For example, the speech recognition apparatus 100 may detect presence or absence of utterance by Voice Activation Detection (VAD) or End Point Detection (EPD).

For example, the speech recognition apparatus 100 may determine that a sentence starts when utterance starts and may start storing the input audio signal. The speech recognition apparatus 100 may determine that the sentence starts when the utterance starts after pause and may start storing the input audio signal.

Figure 5:
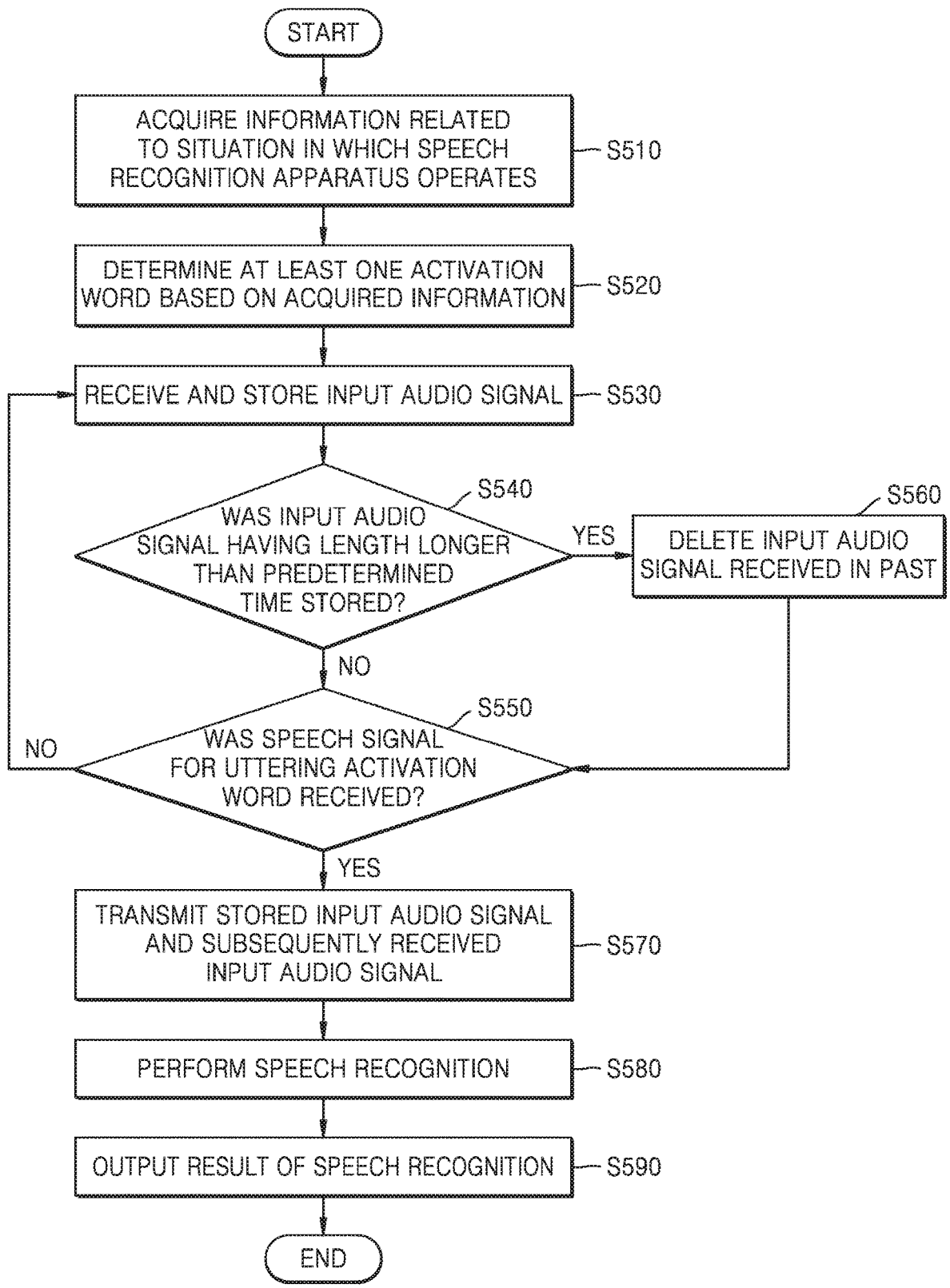
FIG. 5 is a flowchart illustrating a method of performing speech recognition by a speech recognition apparatus according to an embodiment of the present disclosure.

The speech recognition apparatus 100 may determine that the sentence ends if the utterance ends without uttering an activation word and may start storing the input audio signal. Alternatively, the speech recognition apparatus 100 may receive and store an audio signal in a predetermined time length unit as shown in FIG. 5.

In operation S330, the speech recognition apparatus 100 may perform speech recognition on the input audio signal, based on whether or not the speech signal for uttering the activation word included in the at least one activation word is included in the input audio signal. The speech recognition apparatus 100 may recognize, apply, and process a language of a speaker included in the input audio signal by using the artificial intelligence technology.

The speech recognition apparatus 100 may perform speech recognition on the input audio signal including the speech signal for uttering the activation word included in the at least one activation word.

The speech recognition apparatus 100 may determine whether the input audio signal includes a speech signal for uttering an activation word. When it is determined that the input audio signal includes the speech signal for uttering the activation word included in the at least one activation word, the speech recognition apparatus 100 may perform speech recognition on the stored input audio signal and the input audio signal received thereafter.

The speech recognition apparatus 100 may transmit an audio signal including a speech command including an activation word to a server (or an embedded speech recognition module). The server (or the embedded speech recognition module) may extract an activation word from the received audio signal. The server (or the embedded speech recognition module) may determine whether to recognize a speech command including the activation word or remove the activation word and recognize speech commands located before or after the activation word. The server (or the embedded speech recognition module) may perform speech recognition based on a determination result. The speech recognition apparatus 100 may perform speech recognition on the speech command including the activation word when the activation word has a meaning in the speech command. On the other hand, when the activation word does not have the meaning in the speech command, the speech recognition apparatus 100 may perform speech recognition on a previous sentence or a succeeding sentence from which the activation word is removed.

For example, in order to activate the speech recognition function of the speech recognition apparatus 100, a case where "Hi Robot" is determined as a basic activation word and "weather" is determined as an activation word corresponding to a current situation is explained as an example.

The user may utter "Hi Robot Call Hana" to the speech recognition apparatus 100. Since the speech recognition apparatus 100 has received a speech signal for uttering the activation word "Hi Robot", the speech recognition apparatus 100 may transmit a speech command including the activation word "Hi Robot Call Hana" to the server (or the embedded speech recognition module). Since the activation word "Hi Robot" is a basic activation word having no meaning in the speech command, the server (or the embedded speech recognition module) may perform speech recognition on only "Call Hana" that is the speech command from which the activation word is removed.

Alternatively, the user may utter "What is the weather like today?" to the speech recognition apparatus 100. Since the speech recognition apparatus 100 has received the speech signal for uttering the activation word "weather", the speech recognition apparatus 100 may transmit "What is weather like today?" that is a speech command including the activation word to the server (or the embedded speech recognition module). The server (or the embedded speech recognition module) may perform speech recognition on "What is the weather like today?" that is a speech command including the activation word since the activation word "weather" has meaning in the speech command.

The speech recognition apparatus 100 may transmit an audio signal from which the speech command for uttering the activation word is removed from the input audio signal to the server (or the embedded speech recognition module). The speech recognition apparatus 100 may extract the activation word from the input audio signal. The speech recognition apparatus 100 may determine whether to transmit an audio signal including the speech command for uttering the activation word to the server (or the embedded speech recognition module) or transmit the audio signal from which the speech command for uttering the activation word is removed to the server (or the embedded speech recognition module). The speech recognition apparatus 100 may transmit the audio signal including the speech command for uttering the activation word to the server (or the embedded speech recognition module) when the activation word has the meaning in the speech command. On the other hand, when the activation word does not have a meaning in the speech command, the speech recognition apparatus 100 may transmit a previous sentence or a succeeding sentence from which the speech command for uttering the activation word is removed to the server (or the embedded speech recognition module).

For example, in order to activate the speech recognition function of the speech recognition apparatus 100, a case where "Hi Robot" is determined as a basic activation word will be described as an example.

The user may utter "Hi Robot. Call Hana." to the speech recognition apparatus 100. Since the activation word "Hi Robot" is a basic activation word having no meaning in the speech command, the speech recognition apparatus 100 may transmit only "Call Hana" that is the audio signal from which the speech command for uttering the activation word is removed to the server (or the embedded speech recognition module).

When it is determined that the input audio signal includes a speech signal for uttering the activation word, the speech recognition apparatus 100 may determine whether the speech command included in the input audio signal is a direct command requesting a response of the speech recognition apparatus 100. The speech recognition apparatus 100 may determine whether the speech command is the direct command or an indirect command based on natural language understanding and sentence analysis regarding extracted text. For example, the speech recognition apparatus 100 may determine whether the speech command is the direct command or the indirect command based on at least one of a termination end of the speech command, an intonation, a direction in which the speech command is received, and a size of the speech command. The speech recognition apparatus 100 may determine whether to transmit the speech command to the server (or the embedded speech recognition module) or to perform speech recognition on the speech command, according to a determined type of the speech command. For example, the speech recognition apparatus 100 may perform natural language understanding and sentence type analysis using artificial intelligence technology.

The speech recognition apparatus 100 may transmit the audio signal including the speech command including the activation word to the server (or the embedded speech recognition module) when it is determined that the speech command is the direct command. When the speech signal for uttering the activation word is received, the speech recognition apparatus 100 may transmit the stored input audio signal and an input audio signal received thereafter to the server (or the embedded speech recognition module).

The speech recognition apparatus 100 may search for and extract a signal including a sentence including an activation word from the stored input audio signal. The speech recognition apparatus 100 may transmit an audio signal including the sentence containing the activation word to the server (or the embedded speech recognition module). The server (or the embedded speech recognition module) may perform speech recognition on the speech command.

On the other hand, when the speech recognition apparatus 100 determines that the speech command is not the direct command requesting the response of the speech recognition apparatus 100 but is the indirect command, the speech recognition apparatus 100 may not transmit the audio signal including the speech signal to the server (or the embedded speech recognition module). The speech recognition apparatus 100 may repeat an operation of receiving and storing a new input audio signal while ignoring the previously input audio signal. The speech recognition apparatus 100 may determine whether or not the new input audio signal includes the speech signal for uttering the activation word.

In operation S340, the speech recognition apparatus 100 according to an embodiment may output a result of performing speech recognition.

The speech recognition apparatus 100 may output the result of speech recognition performed by the server (or the embedded speech recognition module). As an example, the result of performing speech recognition may include text extracted from a speech command. As another example, the result of performing speech recognition may be a screen performing an operation corresponding to the result of performing speech recognition. The speech recognition apparatus 100 may perform an operation corresponding to the result of performing speech recognition. For example, the speech recognition apparatus 100 may determine a function of the speech recognition apparatus 100 corresponding to the result of performing speech recognition, and output a screen performing the function. Alternatively, the speech recognition apparatus 100 may transmit a keyword corresponding to the result of performing speech recognition to an external server, receive information related to the transmitted keyword from the server, and output the received information on the screen.

The speech recognition apparatus 100 may determine a method of outputting the result of performing speech recognition based on an analysis result by analyzing a speech command.

As an example, the speech recognition apparatus 100 may output the result of speech recognition performed in various ways such as sound, light, image, and vibration in response to a speech command. As another example, the speech recognition apparatus 100 may notify the user that a response is waiting while waiting for a response to the speech command. The speech recognition apparatus 100 may inform the user that the response is waiting in various ways such as sound, light, image, and vibration. As another example, the speech recognition apparatus 100 may store the result of performing speech recognition and then when the user makes an utterance related to the result of performing speech recognition and output the result of performing speech recognition.

The speech recognition apparatus 100 may determine whether the speech command included in the input audio signal is a direct command requesting a response of the speech recognition apparatus 100. The speech recognition apparatus 100 may determine whether to output the result of performing speech recognition immediately or to output the result of performing speech recognition when a confirmation command is received from the user according to the determined type of the speech command.

The speech recognition apparatus 100 may extract text uttered by the user by performing speech recognition on the input audio signal. The speech recognition apparatus 100 may determine whether the speech command included in the input audio signal is the direct command requesting the response of the speech recognition apparatus 100, based on natural language understanding and sentence type analysis regarding the extracted text. The speech recognition apparatus 100 may perform an operation of responding to the speech command when it is determined that the speech command is the direct command.

When it is determined that the speech command is not the direct command, the speech recognition apparatus 100 may display that a response to the speech command is possible and the response is waiting. The speech recognition apparatus 100 may perform the operation of responding to the speech command when a confirmation command is received from the user.

Figure 4:
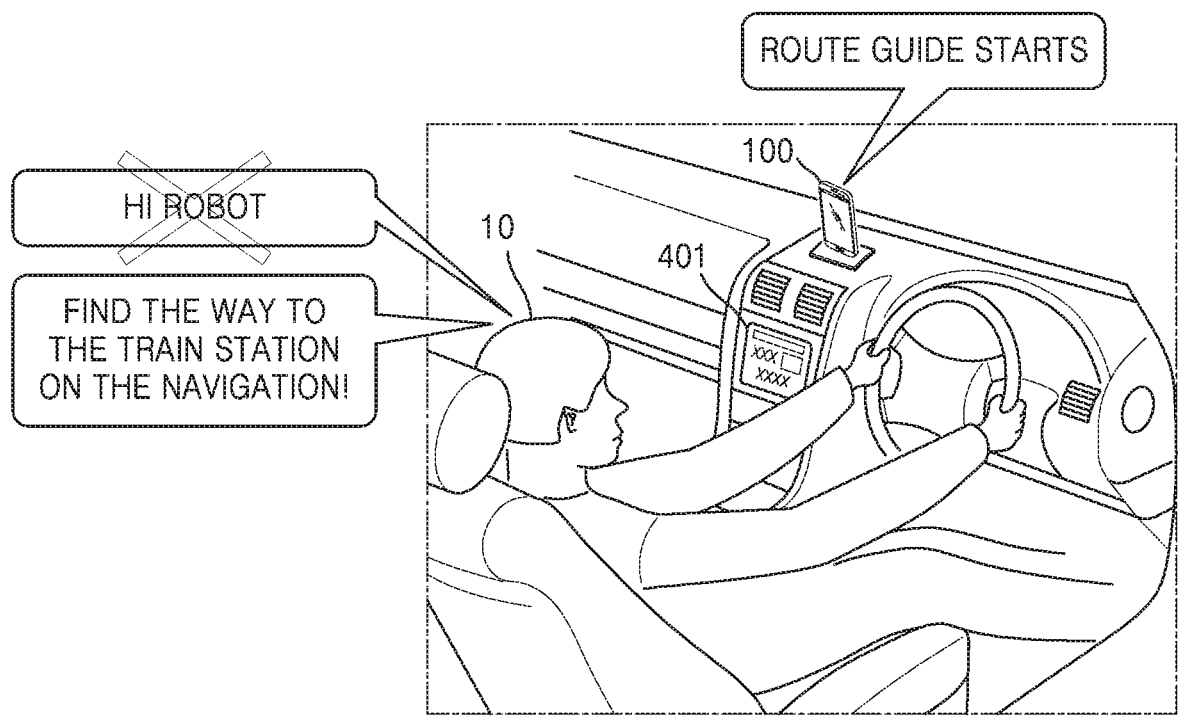
FIG. 4 is a diagram of a method of performing speech recognition by a speech recognition apparatus according to an embodiment of the present disclosure.

FIG. 4 is a diagram for explaining a method of performing speech recognition by the speech recognition apparatus 100 according to an embodiment of the present disclosure.

Referring to FIG. 4, an example is illustrated in which the speech recognition apparatus 100 is connected to an electronic control apparatus 401 of a vehicle and operates. For example, the speech recognition apparatus 100 may communicate with the electronic control apparatus 401 of the vehicle via Bluetooth.

The speech recognition apparatus 100 according to an embodiment may determine that a location of the speech recognition apparatus 100 is the vehicle based on information that the speech recognition apparatus 100 is connected to the electronic control apparatus 401 of the vehicle. The speech recognition apparatus 100 may determine at least one activation word corresponding to the vehicle. For example, the speech recognition apparatus 100 may extract candidate activation words corresponding to the vehicle including navigation, an air conditioner, a window, a gas supply, a trunk, a side mirror, etc., and candidate activation words corresponding to functions available in the vehicle including, for example, a text message, a schedule, etc. The speech recognition apparatus 100 may determine the extracted candidate activation words as activation words suitable for a current situation.

Further, the speech recognition apparatus 100 may determine an activation word based on whether or not the speech recognition apparatus 100 is moving. When the vehicle is traveling, the speech recognition apparatus 100 may determine only the candidate activation words that do not disturb safe vehicle operation among the candidate activation words corresponding to the vehicle and the candidate activation words corresponding to the functions available in the vehicle as activation words.

For example, when the vehicle is stopped, the speech recognition apparatus 100 may determine all candidate activation words related to the vehicle, such as the navigation, the air conditioner, the gas supply, the trunk, the side mirror, the text message, the schedule, etc. On the other hand, when the vehicle is traveling, the speech recognition apparatus 100 may determine an activation word so that the speech recognition apparatus 100 does not respond to speech commands that may disturb safe vehicle operation. For example, when the vehicle is traveling, opening the trunk of the vehicle or opening the gas supply by a speech command may disturb safe vehicle operation. Therefore, when the vehicle is traveling, the speech recognition apparatus 100 may determine only some candidate activation words, such as navigation, air conditioner, text message, and schedule, which do not disturb safe vehicle operation as activation words.

The speech recognition apparatus 100 may receive and store an input audio signal prior to performing speech recognition. The speech recognition apparatus 100 may analyze the input audio signal to determine whether the input audio signal includes a speech signal for uttering an activation word.

The user 10 may use the speech recognition function without having to utter a specific activation word such as "Hi Robot" to be guided to a train station. The user 10 may utter "Find the way to the train station on the navigation!" that is a speech command to ask for a direction to get to the train station. The speech recognition apparatus 100 may activate the speech recognition function when a speech signal for uttering "navigation" which is an activation word corresponding to the vehicle is received.

The speech recognition apparatus 100 may perform speech recognition on "Find the way to the train station on the navigation!" that is a whole speech command including the speech signal for uttering "navigation". When the speech signal for uttering "navigation" is received, the speech recognition apparatus 100 may transmit "Find at" which is a speech command received after the activation word to a server (or an embedded speech recognition module) and perform speech recognition. In addition, the speech recognition apparatus 100 may transmit a previously received and stored speech command to the server (or the embedded speech recognition module) together with the speech command received after the activation word and perform speech recognition. When the speech signal for uttering "navigation" is received, the speech recognition apparatus 100 may perform speech recognition on "the way to the train station" that is the speech command which is received and stored before the activation word, the activation word "navigation", and "Find at" which is the speech command received after the activation word.

The speech recognition apparatus 100 may guide a route to a train station as a response to the speech command of the user 10.

In FIG. 4, a case where the location of the speech recognition apparatus 100 is the vehicle is shown as an example. However, embodiments of the present disclosure are not limited thereto. For example, when it is determined that the location of the speech recognition apparatus 100 is a house, light, television, air conditioner, washing machine, refrigerator, weather, date, time, etc. may be determined as activation words corresponding to the house.

Specific examples of the activation words corresponding to respective situations are as follows.

The speech recognition apparatus 100 may determine at least one activation word based on the location of the speech recognition apparatus 100 or a characteristic of a space in which the speech recognition apparatus 100 is located.

The speech recognition apparatus 100 may acquire information related to the location of the speech recognition apparatus 100 based on an electronic apparatus connected to the speech recognition apparatus 100, a network connected to the speech recognition apparatus 100, or a base station connected to the speech recognition apparatus 100.

For example, the speech recognition apparatus 100 may determine that the speech recognition apparatus 100 is located in the vehicle when the speech recognition apparatus 100 is connected to audio in the vehicle via a Bluetooth method. Alternatively, the speech recognition apparatus 100 may acquire information related to a current location by a GPS module included in the speech recognition apparatus 100.

As an example, when the speech recognition apparatus 100 is located in the house, the speech recognition apparatus 100 may determine words associated with an electronic apparatus that the speech recognition apparatus 100 may control in the house or a function of the electronic apparatus as activation words. As the location of the speech recognition apparatus 100 in the house changes, the speech recognition apparatus 100 may determine different words as activation words according to the location. For example, when the speech recognition apparatus 100 is located in a living room, the speech recognition apparatus 100 may determine words associated with all electronic apparatuses in the house as activation words. On the other hand, when the speech recognition apparatus 100 is located in a room, the speech recognition apparatus 100 may determine only words associated with electronic apparatuses in the room as activation words.

As another example, when the speech recognition apparatus 100 is located in the vehicle, the speech recognition apparatus 100 may determine words associated with an electronic apparatus that the speech recognition apparatus 100 may control in the vehicle or a function of the electronic apparatus as activation words. The speech recognition apparatus 100 may determine different activation words even when the location of the speech recognition apparatus 100 in the vehicle changes or a characteristic of a user of the speech recognition apparatus 100 changes.

When the speech recognition apparatus 100 is located in a driver's seat or a user of the speech recognition apparatus 100 is driving, the speech recognition apparatus 100 may determine words related to all electronic apparatuses and functions that a driver may control in the vehicle as activation words. On the other hand, when the speech recognition apparatus 100 is located in a seat other than the driver's seat or the user of the speech recognition apparatus 100 is not driving, the speech recognition apparatus 100 may determine only words related to electronic apparatuses and functions that do not disturb driving as activation words.

For example, when the user of the speech recognition apparatus 100 is a driving driver, words related to driving of the vehicle such as "side mirrors", "lights", "steering wheels", etc. as activation words. On the other hand, when the user of the speech recognition apparatus 100 is a passenger who does not drive, only words related to electronic apparatuses that are not related to the driving of the vehicle such as "an air conditioner", "radio", etc. as activation words.

As another example, when the speech recognition apparatus 100 is located outdoors, the speech recognition apparatus 100 may determine an activation word based on whether or not there is an environment in which noise exists. For example, the speech recognition apparatus 100 may not determine, as an activation word, a word whose characteristic is similar to that of noise in an environment in which noise is frequently generated.

As another example, the speech recognition apparatus 100 may determine an activation word based on whether a space in which the speech recognition apparatus 100 is located is a common space or a private space. For example, when the speech recognition apparatus 100 is located in a common space such as a corridor of a company, the speech recognition apparatus 100 may determine only words corresponding to the common space as activation words. On the other hand, when the speech recognition apparatus 100 is located in a private space such as a private office, the speech recognition apparatus 100 may determine words related to private affairs as activation words together with the words corresponding to the public space. For example, when the speech recognition apparatus 100 is located in the common space, the speech recognition apparatus 100 may activate a speech recognition function by activation words corresponding to the common space such as "air conditioner", "light", etc. However, when the speech recognition apparatus 100 is located in the private space, the speech recognition apparatus 100 may also activate the speech recognition function by the words related to private affairs, such as "telephone" or "text message" along with the activation words corresponding to the public space, such as "air conditioner", "light", etc.

As another example, the speech recognition apparatus 100 may determine words on which local language characteristics are reflected as activation words based on a region where the speech recognition apparatus 100 is located. For example, when the speech recognition apparatus 100 is located in a region where a dialect is used, the speech recognition apparatus 100 may determine words on which the dialect is reflected as activation words.

The speech recognition apparatus 100 according to an embodiment may determine at least one activation word based on time.

As an example, the speech recognition apparatus 100 may use a specific word as an activation word for a specific period of time. After the specific period of time, the speech recognition apparatus 100 may no longer use the specific word as the activation word.

The speech recognition apparatus 100 may determine a word whose frequency of use has recently increased as an activation word by learning speech commands received from the user. For example, if the user is about to travel to Jeju Island, the user may frequently input speech commands related to "Jeju Island" to the speech recognition apparatus 100 to obtain information related to "Jeju Island". The speech recognition apparatus 100 may add a word frequently appearing above a threshold frequency number as an activation word. Therefore, even if the user does not separately activate the speech recognition function, the user may use the speech recognition function by simply uttering a speech command including the added activation word.

As another example, the speech recognition apparatus 100 may determine the activation word based on current time information in which the speech recognition apparatus 100 is operating. For example, the speech recognition apparatus 100 may use different activation words depending on season, day, date, whether it is weekend or weekday, and a time zone. The speech recognition apparatus 100 may learn speech commands received from the user according to the season, the day, the date, the time, etc., thereby updating an activation word suitable for each situation and using the updated activation word.

As another example, the speech recognition apparatus 100 may determine at least one activation word based on a movement of the user of the speech recognition apparatus 100. The speech recognition apparatus 100 may reflect a change in an utterance characteristic in determining the activation word depending on whether the user of the speech recognition apparatus 100 stops moving, is walking, or is running. For example, when the user of the speech recognition apparatus 100 is walking or running, the speech recognition apparatus 100 may reflect a characteristic that the user who breathes out to determine the activation word.

The speech recognition apparatus 100 may determine at least one activation word based on information related to a characteristic of the user who uses the speech recognition apparatus 100.

As an example, the speech recognition apparatus 100 may determine at least one activation word based on an age of the user of the speech recognition apparatus 100.

When the user of the speech recognition apparatus 100 is an adult, the speech recognition apparatus 100 may determine words related to a common interest of the adult as activation words. For example, the speech recognition apparatus 100 may determine words such as news, sports, etc. which are related to the common interest of the adult as activation words.

If the user of the speech recognition apparatus 100 is not an adult, the speech recognition apparatus 100 may determine words related to characteristics of the minor as activation words. For example, when the user is a high school student, the speech recognition apparatus 100 may determine words such as test, math, differential integration, etc. related to a common interest of the high school student as activation words.

As another example, the speech recognition apparatus 100 may determine at least one activation word based on a gender of the user of the speech recognition apparatus 100.

When the user of the speech recognition apparatus 100 is a woman, the speech recognition apparatus 100 may determine words related to a common interest of the woman as activation words. For example, the speech recognition apparatus 100 may determine a word "cosmetics" that is related to the common interest of the woman as an activation word.

As another example, the speech recognition apparatus 100 may determine at least one activation word based on an occupation or hobby of the user of the speech recognition apparatus 100.

The speech recognition apparatus 100 may determine words on which characteristics of the user according to occupations are reflected or words related to hobbies as activation words. For example, when the hobby of the user of the speech recognition apparatus 100 is listening to music, the speech recognition apparatus 100 may determine words related to hobby such as music, radio, etc. as activation words.

On the other hand, the speech recognition apparatus 100 may operate differently depending on whether the speech recognition apparatus 100 is used by only one person or by several people. When the speech recognition apparatus 100 is used by several people, prior to performing speech recognition, the speech recognition apparatus 100 may recognize the gender or age of the user by analyzing a characteristic of speech or may perform an operation of identifying the user by analyzing a characteristic of a face. The speech recognition apparatus 100 may determine words suitable for the identified user as activation words.

The speech recognition apparatus 100 may reflect history in which words are used in determining an activation word.

The speech recognition apparatus 100 may reflect history in which words are used in common regardless of the user in determining the activation word. The speech recognition apparatus 100 may determine the activation word from a database including candidate activation words corresponding to each situation in common regardless of the user. However, embodiments of the present disclosure are not limited thereto.

The speech recognition apparatus 100 may reflect history in which words are used by each individual in determining an activation word. The speech recognition apparatus 100 may manage a database including candidate activation words suitable for each individual. The speech recognition apparatus 100 may update a personalized database by accumulating a frequency of using words in each situation for each individual. The speech recognition apparatus 100 may determine an activation word suitable for a current situation from the personalized database.

FIG. 5 is a flowchart illustrating a method of performing speech recognition by the speech recognition apparatus 100 according to an embodiment of the present disclosure.

Operations S510 and S520 of FIG. 5 may correspond to operation S310 of FIG. 3, operation S530 of FIG. 5 may correspond to operation S320 of FIG. 3, operations S540 to S580 of FIG. 5 may correspond to operation S330 of FIG. 3, and operation S590 of FIG. 5 may correspond to operation S340 of FIG. 3. Descriptions of FIG. 3 may be applied to each operation of FIG. 5 corresponding to each operation of FIG. 3. Thus, descriptions of redundant operations are omitted.

In operation S510, the speech recognition apparatus 100 may acquire information related to a situation in which the speech recognition apparatus 100 operates.

The speech recognition apparatus 100 may include one or more sensors and may sense various information for determining the situation in which the speech recognition apparatus 100 operates. For example, the sensor included in the speech recognition apparatus 100 may sense a location of the speech recognition apparatus 100, information related to a movement of the speech recognition apparatus 100, information capable of identifying a user who is using the speech recognition apparatus 100, and surrounding environment information of the speech recognition apparatus 100, and the like.

For example, the speech recognition apparatus 100 may include at least one of an illuminance sensor, a biosensor, a tilt sensor, a position sensor, a proximity sensor, a geomagnetic sensor, a gyroscope sensor, a temperature/humidity sensor, an infrared ray sensor, and a speed/acceleration sensor, or a combination thereof.

The speech recognition apparatus 100 may acquire information sensed by an external electronic apparatus as the information related to the situation in which the speech recognition apparatus 100 operates. For example, the external electronic apparatus may be at least one of an illuminance sensor, a biosensor, a tilt sensor, a position sensor, a proximity sensor, a geomagnetic sensor, a gyroscope sensor, a temperature/humidity sensor, an infrared ray sensor, and a speed/acceleration sensor, or a combination thereof.

The speech recognition apparatus 100 may acquire a user input as the information related to the situation in which the speech recognition apparatus 100 operates. The speech recognition apparatus 100 may acquire information related to a location in which the speech recognition apparatus 100 operates or a characteristic of a user of the speech recognition apparatus 100 from the user input.

The speech recognition apparatus 100 may acquire the information related to the situation in which the speech recognition apparatus 100 operates through communication with another electronic apparatus. For example, when the speech recognition apparatus 100 is connected to an electronic apparatus recognized as existing in a house through near distance communication, the speech recognition apparatus 100 may determine that the speech recognition apparatus 100 is present in the house. For example, the speech recognition apparatus 100 may acquire information such as house, indoors, private space as the location of the speech recognition apparatus 100.

In operation S520, the speech recognition apparatus 100 according to an embodiment may determine at least one activation word based on the information obtained in operation S510.

As an example, the speech recognition apparatus 100 may store candidate activation words suitable for each situation with respect to a plurality of situations prior to determining an activation word. Based on the information obtained in operation S510, the speech recognition apparatus 100 may retrieve candidate activation words suitable for a current situation from the stored data. The speech recognition apparatus 100 may determine at least one of the retrieved candidate activation words as the activation word.

As another example, the speech recognition apparatus 100 may communicate with a server that stores candidate activation words suitable for each situation with respect to the plurality of situations prior to determining the activation word. Based on the information obtained in operation S510, the speech recognition apparatus 100 may retrieve candidate activation words suitable for the current situation from the server. The speech recognition apparatus 100 may determine at least one of the retrieved candidate activation words as the activation word. The candidate activation words for each situation stored in the server may be shared and used by a plurality of speech recognition apparatuses.

The speech recognition apparatus 100 may determine the number of activation words to be determined based on a degree to which a speech recognition function of the speech recognition apparatus 100 is sensitively activated. A priority may be assigned to the candidate activation words for each situation. The speech recognition apparatus 100 may determine some of the candidate activation words as at least one activation word based on the degree to which the speech recognition function is sensitively activated and priority.

The speech recognition apparatus 100 may determine at least one activation word based on information related to a characteristic of the user of the speech recognition apparatus 100. As an example, the speech recognition apparatus 100 used by families of various ages may determine different activation words by recognizing a speech age, by recognizing the face of the user, or initially input user information.

For example, when a parent uses the speech recognition apparatus 100 in a house, the speech recognition apparatus 100 may determine all candidate activation words related to the house such as a TV, an air conditioner, a vacuum cleaner, weather, a schedule, an Internet connection, watching of TV channels for children, heating, cooling, humidity control, etc., as at least one activation word. On the other hand, when a child uses the speech recognition apparatus 100 in the house, the speech recognition apparatus 100 may determine the activation word so as to respond only to speech commands that are allowed to be controlled by a speech command of the child. Therefore, the speech recognition apparatus 100 may determine only some candidate activation words such as weather, watching of TV channels for children, etc. as at least one activation word.

In operation S530, the speech recognition apparatus 100 may receive and store the input audio signal.

In operation S540, the speech recognition apparatus 100 may determine whether or not an input audio signal having a length longer than a predetermined time has been stored. If the input audio signal having the length longer than the predetermined time is stored, then in operation S560, the speech recognition apparatus 100 may delete the input audio signal that was received in the past.

Although FIG. 5 shows an example of receiving an audio signal in units of a predetermined time length, embodiments of the present disclosure are not limited to that shown in FIG. 5. As described above, the speech recognition apparatus 100 may receive and store an audio signal in units of a sentence. Alternatively, the speech recognition apparatus 100 may receive and store the audio signal in units of data of a predetermined size.

In operation S550, the speech recognition apparatus 100 according to an embodiment may determine whether a speech signal for uttering the activation word has been received.

When the speech signal for uttering the activation word is received, then in operation S570, the speech recognition apparatus 100 may transmit the stored input audio signal and the input audio signal received thereafter to a server (or an embedded speech recognition module). The speech recognition apparatus 100 may search for and extract a signal including a sentence including an activation word from the stored input audio signals. The speech recognition apparatus 100 may transmit the audio signal including the sentence including the activation word to the server (or the embedded speech recognition module).

The speech recognition apparatus 100 may use the following method to search for and extract a signal including a sentence including an activation word.

As an example, the speech recognition apparatus 100 may determine a start and an end of a sentence based on at least one of a length of a silence section, a sentence structure, and an intonation. The speech recognition apparatus 100 may transmit the audio signal corresponding to the sentence including the activation word to the server (or the embedded speech recognition module) based on a determined result.

As another example, the speech recognition apparatus 100 may determine a past audio signal of a predetermined length and a currently received audio signal as a start and an end of a sentence from the speech signal in which the activation word is uttered. The speech recognition apparatus 100 may transmit the audio signal corresponding to the sentence including the activation word to the server (or the embedded speech recognition module) based on the determined result.

As another example, the speech recognition apparatus 100 may determine a past speech signal of a variable length before the speech signal in which the activation word has been uttered and a speech signal of a variable length after the speech signal in which the activation word has been uttered as a start and an end of a sentence based on a grammatical position of the activation word. The speech recognition apparatus 100 may transmit the audio signal corresponding to the sentence including the activation word to the server (or the embedded speech recognition module) based on the determined result.

In operation S550, if it is determined that the speech signal for uttering the activation word has not been received, the speech recognition apparatus 100 may repeatedly perform the operation of receiving and storing the input audio signal of the length longer than the predetermined length.

In operation S580, the speech recognition apparatus 100 may perform speech recognition. The speech recognition apparatus 100 may extract a frequency characteristic of the speech signal from the input audio signal and perform speech recognition using an acoustic model and a language model. In operation S590, the speech recognition apparatus 100 according to an embodiment may output a result of performing speech recognition. The speech recognition apparatus 100 may output the result of performing speech recognition in various ways such as sound, light, image, vibration, etc.

Figure 6:
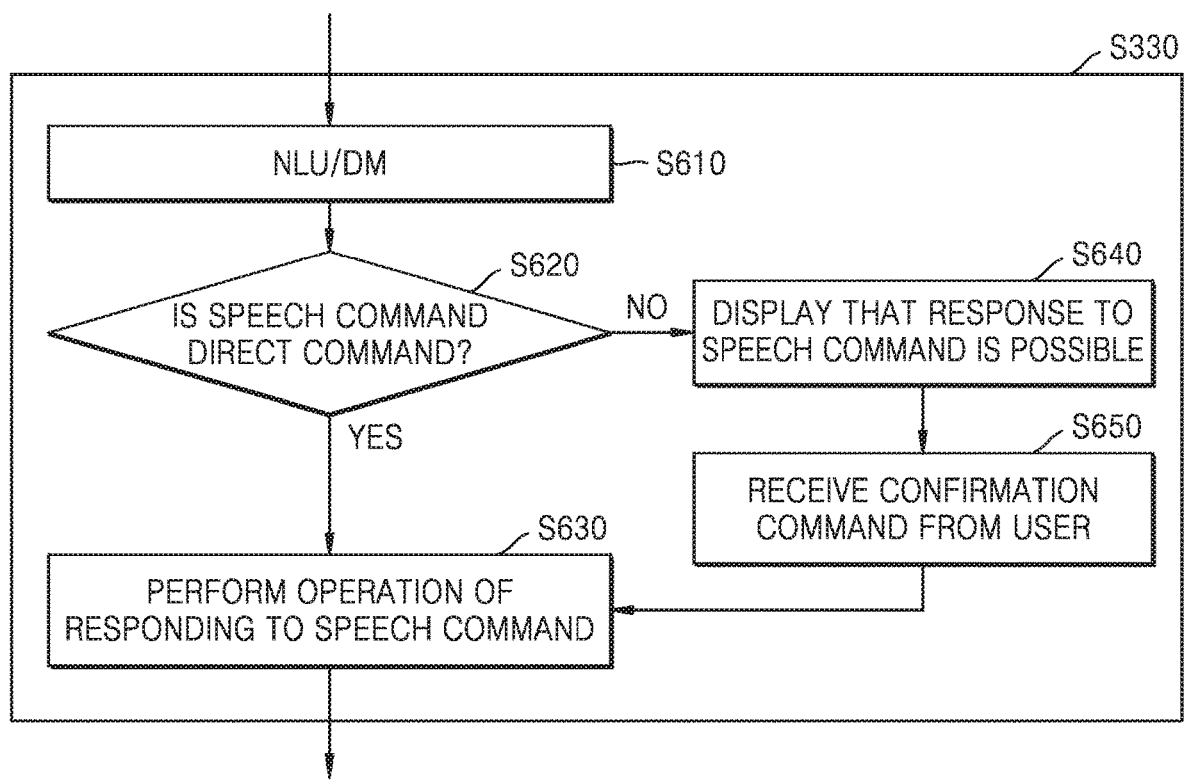
FIG. 6 is a flowchart of a method of outputting a result of speech recognition performed by a speech recognition apparatus according to an embodiment of the present disclosure.

FIG. 6 is a flowchart of a method of outputting a result of speech recognition performed by a speech recognition apparatus according to an embodiment of the present disclosure.

Referring to FIG. 6, operations S610 to S650 in FIG. 6 may correspond to operation S330 in FIG. 3.

In operation S610, the speech recognition apparatus 100 according to an embodiment may analyze a speech command. The speech recognition apparatus 100 may analyze the speech command through natural language understanding and dialog management.

The speech recognition apparatus 100 may perform natural language understanding on the result of performing speech recognition. The speech recognition apparatus 100 may extract text estimated to have been uttered by a speaker by performing speech recognition on the speech command. The speech recognition apparatus 100 may perform natural language understanding on the text estimated to have been uttered by the speaker. The speech recognition apparatus 100 may grasp an intention of the speaker through natural language processing.

In operation S620, the speech recognition apparatus 100 may determine whether the speech command is a direct command for requesting a response of the speech recognition apparatus 100. The speech recognition apparatus 100 may determine whether the speech command is a direct command or an indirect command based on at least one of a sentence structure of the speech command, an intonation, a direction in which the speech command is received, a size of the speech command, and a result of natural language understanding.

The speech command may mean any acoustic speech signal received by the speech recognition apparatus 100 or may mean a speech signal uttered by a human being among the acoustic speech signals received by the speech recognition apparatus 100. The direct command may include a speech command that the user intentionally uttered to allow the speech recognition apparatus 100 to perform an operation that respond to the speech command. The indirect instruction may include all speech commands except the direct command among speech commands uttered by the user. For example, the indirect command may include a speech signal that the user has uttered without intending to perform speech recognition by the speech recognition apparatus 100. In operation S630, the speech recognition apparatus 100 according to an embodiment may perform an operation of responding to the speech command when it is determined that the speech command is the direct command.

If it is determined that the speech command is the indirect command other than the direct command for requesting the response from the speech recognition apparatus 100, then in operation S640, the speech recognition apparatus 100 according to an embodiment may display that a response to the speech command is possible. The speech recognition apparatus 100 may notify the user that the response is waiting while waiting for the response to the speech command.

In operation S650, the speech recognition apparatus 100 may receive a confirmation command from the user. The speech recognition apparatus 100 may perform the operation of responding to the speech command when the confirmation command is received from the user.

Figure 7A:
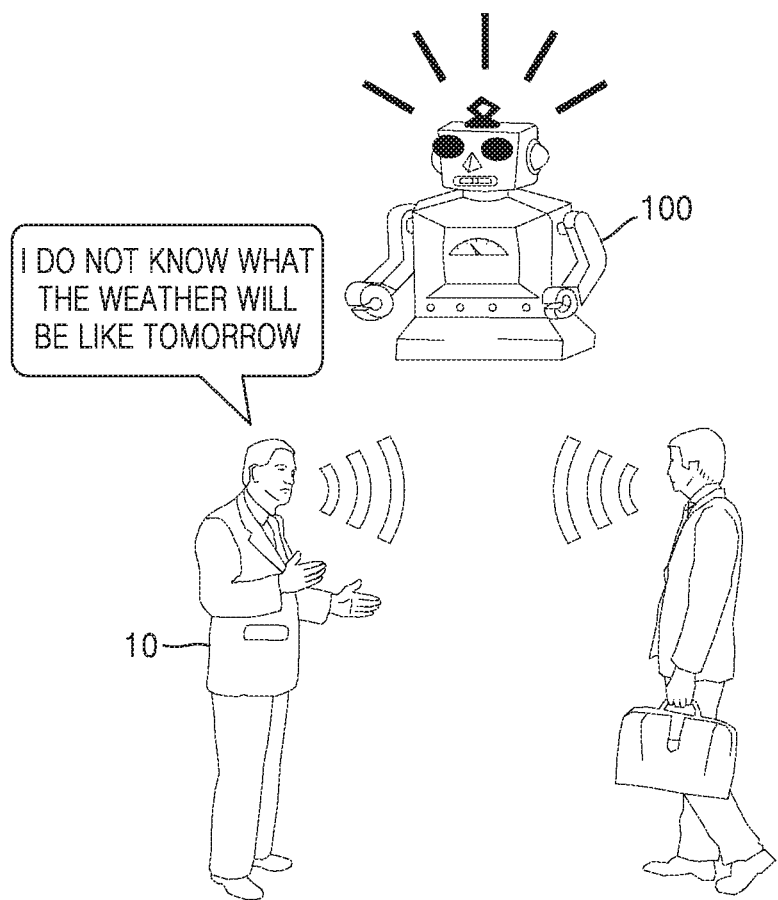
FIGS. 7A and 7B show examples in which a speech recognition apparatus is included in a home robot according to an embodiment of the present disclosure.
Figure 7B:
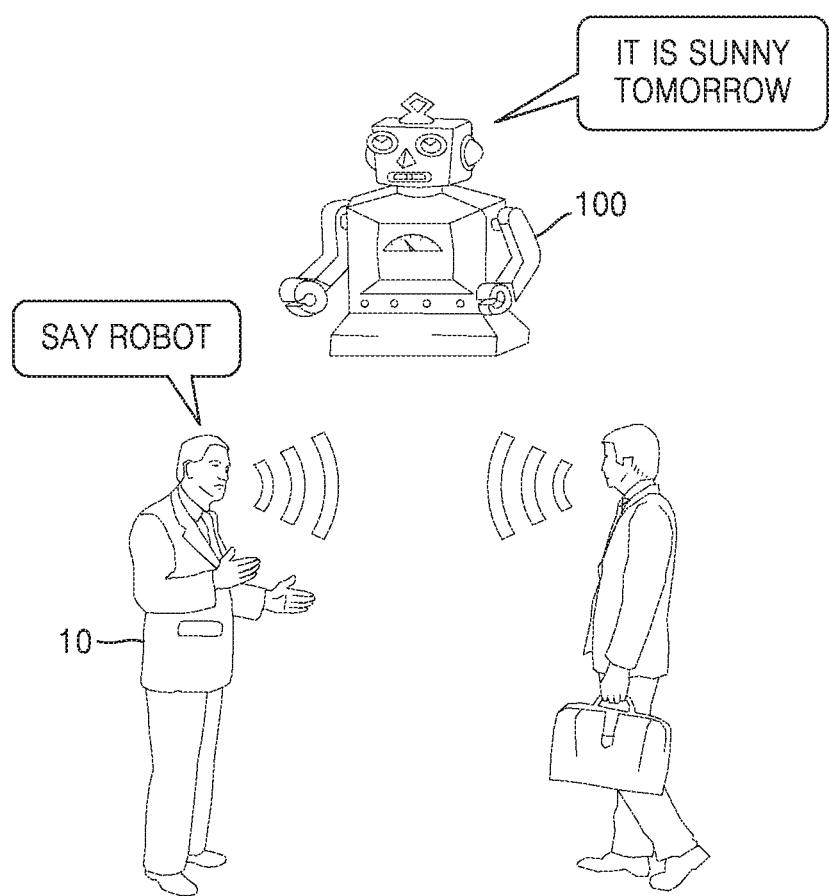

FIGS. 7A and 7B show examples in which a speech recognition apparatus is included in a home robot.

Referring to FIGS. 7A and 7B, embodiments of the present disclosure is not limited to FIGS. 7A and 7B, and the speech recognition apparatus 100 may be various mobile computing apparatuses or non-mobile computing apparatuses. Alternatively, the speech recognition apparatus 100 may be included in a central control apparatus that controls a home network connecting various home appliances in a house.

FIGS. 7A and 7B show cases where the speech recognition apparatus 100 determines "weather" as an activation word corresponding to a current situation according to an embodiment of the present disclosure.

Referring to FIG. 7A, the user 10 may utter "I do not know what the weather will be like tomorrow" expressing an intention to wonder about tomorrow's weather during a dialog with another speaker. Since the speech recognition apparatus 100 has received a speech signal for uttering the activation word "weather", the speech recognition apparatus 100 may perform speech recognition on a sentence "I do not know what the weather will be like tomorrow" including the activation word. The speech recognition apparatus 100 may activate a speech recognition function when the speech signal for uttering the activation word "weather" is received.

The speech recognition apparatus 100 may perform speech recognition on "I do not know what the weather will be like tomorrow", which is a whole speech command including the speech signal for uttering the activation word "weather".

Alternatively, when the speech signal for uttering the activation word "weather" is received, the speech recognition apparatus 100 may transmit "I do not know what" that is a speech command received before the activation word to a server to allow the server to perform speech recognition. Also, the speech recognition apparatus 100 may transmit a previously received and stored speech command to the server together with the speech command received before the activation word and receive a result of speech recognition performed by the server from the server. When the speech signal for uttering the activation word "weather" is received, the speech recognition apparatus 100 may perform speech recognition on "tomorrow" that is a speech command received and stored after the activation word, the activation word "weather", and "I do not know what" that is the speech command received after the activation word.

The speech recognition apparatus 100 may transmit "tomorrow weather" which is a keyword corresponding to the result of performing speech recognition to an external server and may receive and store "sunny" as information related to the transmitted keyword from the server.

The speech recognition apparatus 100 may perform natural language processing and sentence structure analysis on the speech command on which speech recognition has been performed to determine whether the speech command is a direct command for requesting a response of the speech recognition apparatus 100. For example, the speech recognition apparatus 100 may determine that the uttered speech command of FIG. 7A is an indirect command.

Since it is determined that the speech command is an indirect command other than the direct command for requesting the response of the speech recognition apparatus 100, the speech recognition apparatus 100 may display that a response to the speech command is possible. For example, the speech recognition apparatus 100 may inform the user 10 that the response is waiting in various ways such as sound, light, image, vibration, etc.

Referring to FIG. 7B, the user 10 may recognize that the speech recognition apparatus 100 is waiting for the response and may issue a confirmation command to request the response to the speech command. For example, the user 10 may issue the confirmation command to the speech recognition apparatus 100 by speaking "Say Robot" that is a previously confirmed confirmation command. When the confirmation command is received from the user 10, the speech recognition apparatus 100 may output speech "It will be sunny tomorrow" as an operation to respond to the speech command.

As described above, the speech recognition apparatus 100 may perform speech recognition only by making a natural utterance suitable for a situation even if the user 10 does not perform an operation for directly activating the speech recognition function. The speech recognition apparatus 100 may perform speech recognition by recognizing a word included in the natural utterance suitable for the situation uttered by the user 10 as an activation word.

Also, as shown in FIGS. 7A and 7B, information about "today's weather" which is content that the user 10 wants to know may be acquired in advance before receiving the speech command of the user 10 "Say Robot". The speech recognition apparatus 100 may provide a proactive service before the user 10 utters a speech command so that the speech recognition apparatus 100 performs the speech recognition function.

FIGS. 7A and 7B show examples in which the speech recognition apparatus 100 operates in a manner of notifying the user 10 that a response to speech command is waiting while a speech command is an indirect command. However, an embodiment is not limited to FIGS. 7A and 7B.

Figure 8:
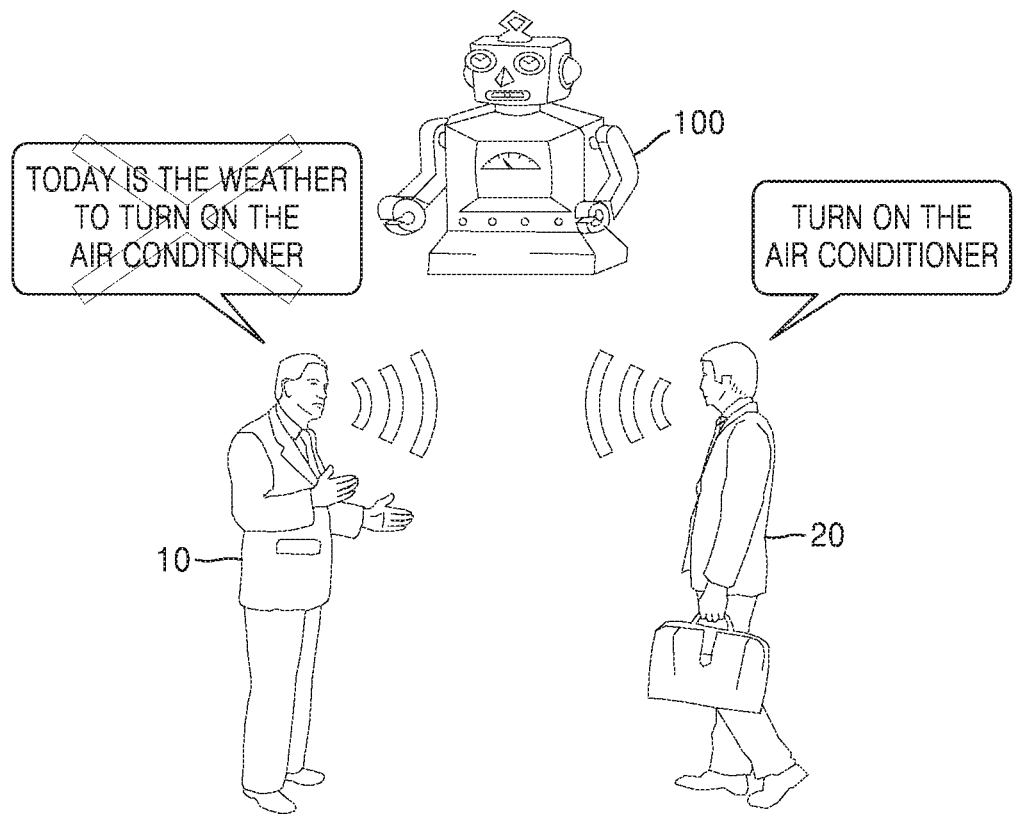
FIG. 8 shows a case where a speech recognition apparatus determines "air conditioner" as an activation word corresponding to a current situation according to an embodiment of the present disclosure.

For example, as shown in FIG. 8, the speech recognition apparatus 100 may output a result of performing speech recognition only when a speech command is a direct command for requesting a response of the speech recognition apparatus 100. The speech recognition apparatus 100 may not take a separate action when the speech command is not the direct command for requesting the response of the speech recognition apparatus 100.

FIG. 8 shows a case where the speech recognition apparatus 100 determines "air conditioner" as an activation word corresponding to a current situation according to an embodiment of the present disclosure.

Referring to FIG. 8, the first user 10 may utter "Today is the weather to turn on the air conditioner" to explain a current weather during a dialog with a second user 20.

Since the speech recognition apparatus 100 has received a speech signal for uttering an activation word "air conditioner", the speech recognition apparatus 100 may determine whether "Today is the weather to turn on the air conditioner" that is a speech command including an activation word is a direct command or an indirect command.

The speech recognition apparatus 100 may determine that a speech command of the first user 10 is not the direct command. For example, the speech recognition apparatus 100 may determine that the speech command of the first user 10 is not the direct command because the speech command of the first user 10 does not have a sentence structure to ask a question or issue a command. The speech recognition apparatus 100 may not transmit an audio signal including the speech command to a server (or an embedded speech recognition module) because it is determined that the speech command of the first user 10 is not the direct command. The speech recognition apparatus 100 may ignore an utterance of the first user 10 that has been received and stored and repeat an operation of newly receiving and storing an input audio signal.

Next, in FIG. 8, the second user 20 may utter "turn on the air conditioner" that is a speech command to request the speech recognition apparatus 100 to turn on the air conditioner in response to the utterance of the first user 10.

Since the speech recognition apparatus 100 has received the speech signal for uttering the activation word "air conditioner", the speech recognition apparatus 100 may determine whether "turn on the air conditioner" that is the speech command including the activation word is a direct command.

The speech recognition apparatus 100 may determine that the speech command of the second user 20 is the direct command. For example, the speech recognition apparatus 100 may determine that the speech command of the second user 20 is the direct command because the speech command of the second user 20 has a sentence structure to issue a command. The speech recognition apparatus 100 may transmit an audio signal including the speech command including the activation word to the server (or the embedded speech recognition module) because it is determined that the speech command of the second user 20 is the direct command. The server (or the embedded speech recognition module) may perform speech recognition on the speech command. The speech recognition apparatus 100 may control the air conditioner so that power of the air conditioner is turned on in response to a speech recognition result.

Figure 9:
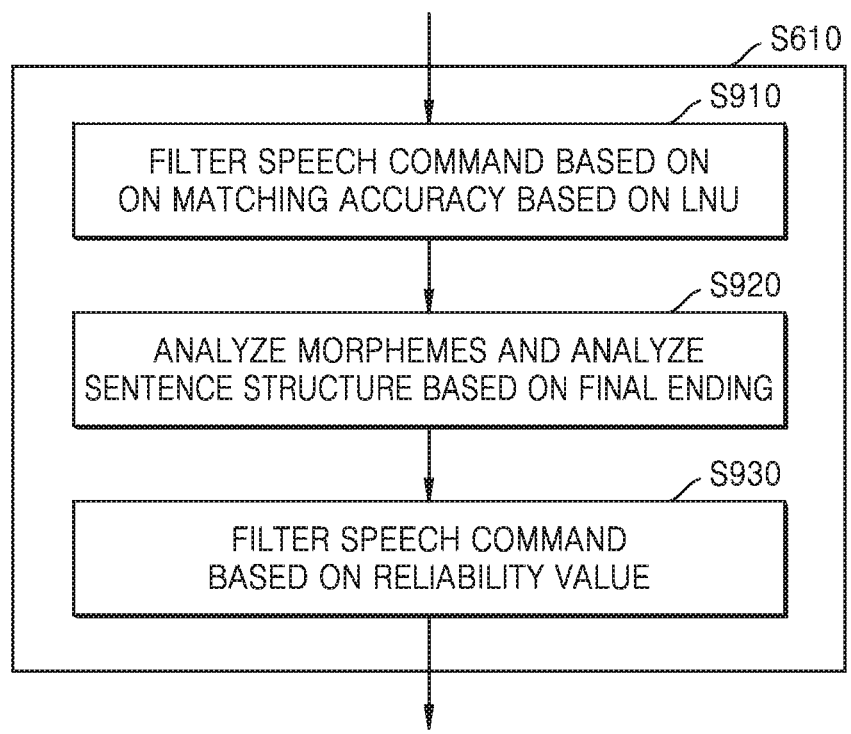
FIG. 9 is a flowchart of a method of determining whether a speech command is a direct command or an indirect command performed by a speech recognition apparatus according to an embodiment of the present disclosure.

FIG. 9 is a flowchart of a method of determining whether a speech command is a direct command or an indirect command performed by a speech recognition apparatus according to an embodiment of the present disclosure.

Referring to FIG. 9, operations S910 to S930 in FIG. 9 may correspond to operation S610 in FIG. 6.

In operation S910, the speech recognition apparatus 100 may filter the speech command based on matching accuracy based on natural language understanding. The speech recognition apparatus 100 may calculate the matching accuracy indicating a degree to which the speech command of a user may be matched with a machine-recognizable command based on natural language understanding. The speech recognition apparatus 100 may primarily determine whether the speech command is the direct command for requesting a response of the speech recognition apparatus 100 by comparing the calculated matching accuracy with a predetermined threshold value.

In operation S920, the speech recognition apparatus 100 may secondarily determine whether the speech command is the direct command by analyzing a sentence structure of the speech command. The speech recognition apparatus 100 may analyze morphemes included in the speech command and analyze the sentence structure of the speech command based on a final ending. For example, when the speech recognition apparatus 100 determines that the speech command is an interrogative type sentence (e.g., "how . . . ?", "what . . . ?", etc.) or an imperative type sentence (e.g., "close . . . !", "stop . . . !", "do . . . !", etc.), the speech command may assign a weight to a reliability value which is a direct command.

In operation S930, the speech recognition apparatus 100 may filter the speech command based on the reliability value calculated in operations S910 and S920. The speech recognition apparatus 100 may finally determine whether the speech command is the direct command by comparing the calculated reliability value through operations S910 and S920 with a predetermined threshold value.

The speech recognition apparatus 100 may extract candidate activation words according to each situation before determining an activation word suitable for a situation. The speech recognition apparatus 100 may store the extracted candidate activation words in an embedded database or a database included in an external server.

Figure 10:
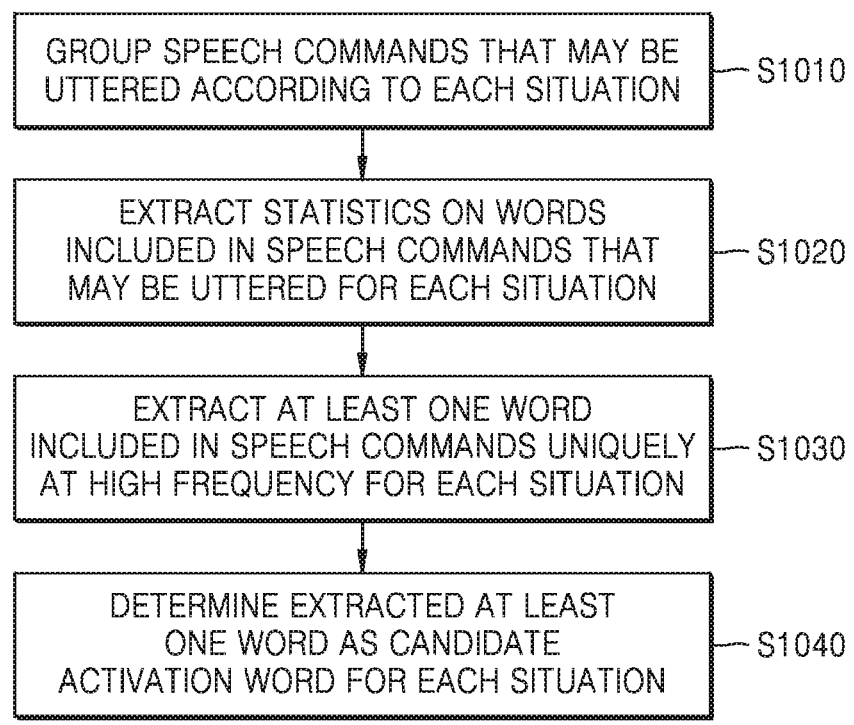
FIG. 10 is a flowchart of a method of determining candidate activation words respectively corresponding to situations performed by a speech recognition apparatus according to an embodiment of the present disclosure.

FIG. 10 is a flowchart of a method of determining candidate activation words respectively corresponding to situations performed by a speech recognition apparatus according to an embodiment of the present disclosure.

Referring to FIG. 10, in operation S1010, the speech recognition apparatus 100 may group speech commands that may be uttered according to each situation. The speech commands that may be uttered in each situation may include speech commands that are expected to be uttered by a user in each situation or speech commands that have been uttered by the user in each situation.

The speech recognition apparatus 100 may receive a corpus uttered by the user in a plurality of situations and group speech commands included in the received corpus. The speech recognition apparatus 100 may receive information about a situation in which the speech commands included in the corpus are uttered, together with the corpus.

In operation S1020, the speech recognition apparatus 100 may extract statistics on words included in the speech commands that may be uttered for each situation. The speech recognition apparatus 100 may extract a frequency of a plurality of words included in speech commands received in each of a plurality of situations.

In operation S1030, the speech recognition apparatus 100 may extract at least one word included in the speech commands uniquely at a high frequency for each situation.

The speech recognition apparatus 100 may exclude a frequently appearing word more than a threshold frequency commonly in the speech commands uttered in the plurality of situations from words included in speech commands uttered in a specific situation uniquely at a high frequency. The speech recognition apparatus 100 may determine a frequently appearing word more than a threshold frequency only in the speech commands uttered in the specific situation as a word appearing uniquely at a high frequency in the speech commands uttered in the specific situation.

In operation S1040, the speech recognition apparatus 100 may determine the extracted at least one word as a candidate activation word for each situation. The speech recognition apparatus 100 may store candidate activation words suitable for each situation with respect to the plurality of situations.

The speech recognition apparatus 100 may extract at least one candidate activation word corresponding to a current situation from stored data. The speech recognition apparatus 100 may determine at least one of the extracted candidate activation words as an activation word.

Referring to FIG. 10, a case where a candidate activation word is determined by analyzing a corpus including speech commands that may be uttered in a plurality of situations has been described as an example. However, embodiments of the present disclosure are not limited to FIG. 10. A user may directly input or delete the candidate activation word corresponding to each situation. The speech recognition apparatus 100 may store a candidate activation word corresponding to a specific situation in a database or delete a specific candidate activation word based on a user input. For example, if the user newly installs an air purifier in a house, the speech recognition apparatus 100 may add "air purifier" as a candidate activation word associated with the house, based on the user input.

Hereinafter, components of the speech recognition apparatus 100 according to an embodiment of the present disclosure will be described. Each component of the speech recognition apparatus 100 described below may perform each operation of the method of performing speech recognition by the speech recognition apparatus 100 described above.

Figure 11A:
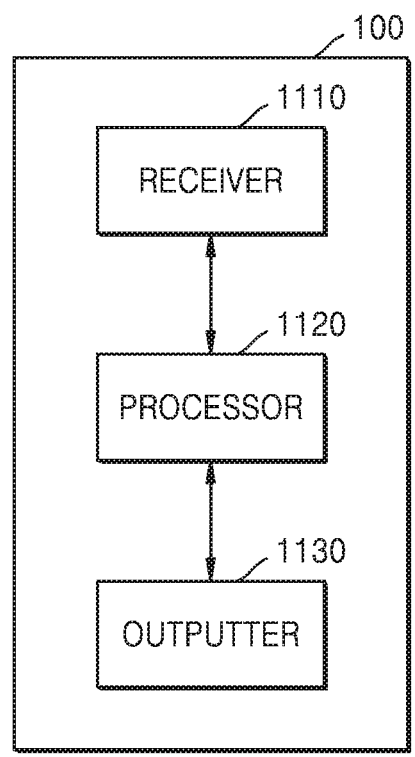
FIGS. 11A and 11B are block diagrams of a speech recognition apparatus according to an embodiment of the present disclosure.
Figure 11B:
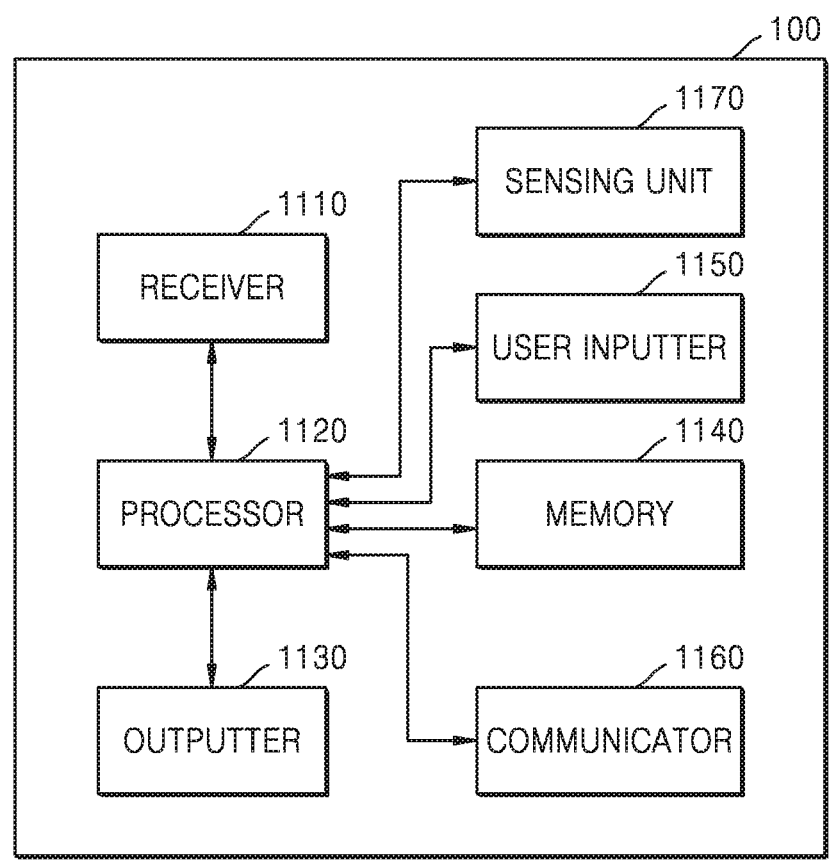

FIGS. 11A and 11B are block diagrams of a speech recognition apparatus according to an embodiment of the present disclosure.

Referring to FIG. 11A, the speech recognition apparatus 100 may include a receiver 1110, a processor 1120, and an outputter 1130. However, the speech recognition apparatus 100 may be implemented by more components than all of the components shown in FIGS. 11A and 11B. As shown in FIG. 11B, the speech recognition apparatus 100 may further include at least one of a memory 1140, a user inputter 1150, a communicator 1160, and a sensing unit 1170.

For example, the speech recognition apparatus 100 according to an embodiment of the present disclosure may be included in at least one of a non-mobile computing device, a mobile computing device, an electronic control apparatus of a vehicle, and a server, or may be connected to at least one of the non-mobile computing device, the mobile computing device, the electronic control apparatus of a vehicle, and the server by wired or wirelessly.

The receiver 1110 may receive an audio signal. For example, the receiver 1110 may directly receive an audio signal by converting external sound into electrical acoustic data by a microphone. Alternatively, the receiver 1110 may receive the audio signal transmitted from an external apparatus. In FIG. 11A, the receiver 1110 is shown as being included in the speech recognition apparatus 100, but the receiver 1110 may be included in a separate apparatus and may be connected to the speech recognition apparatus 100 by wires or wirelessly.

The processor 1120 may control the overall operation of the speech recognition apparatus 100. For example, the processor 1120 may control the receiver 1110, and the outputter 1130. The processor 1120 according to an embodiment may control the operation of the speech recognition apparatus 100 using an artificial intelligence technology. Although FIG. 11A illustrates one processor, the speech recognition apparatus may include one or more processors.

The processor 1120 may determine at least one activation word based on information related to a situation in which the speech recognition apparatus 100 operates. The processor 1120 may obtain at least one of, for example, a location of the speech recognition apparatus 100, time, whether the speech recognition apparatus 100 is connected to another electronic apparatus, whether the speech recognition apparatus 100 is moving, and information related to a characteristic of a user of the speech recognition apparatus 100 as the information related to the situation in which the speech recognition apparatus 100 operates.

The processor 1120 may determine the number of at least one activation word corresponding to a current situation based on a degree to which a speech recognition function of the speech recognition apparatus 100 is sensitively activated in determining the at least one activation word corresponding to the current situation.

When it is determined that a speech signal for uttering an activation word included in the at least one activation word has been received, the processor 1120 may perform speech recognition on the input audio signal.

The processor 1120 may detect a speech signal from the input audio signal input from the receiver 1110 and perform speech recognition on the speech signal. The processor 1120 may include a speech recognition module for performing speech recognition. The processor 1120 may extract a frequency characteristic of the speech signal from the input audio signal and perform speech recognition using an acoustic model and a language model. The frequency characteristic may refer to a distribution of frequency components of an acoustic input extracted by analyzing a frequency spectrum of the acoustic input. Therefore, as shown in FIG. 11B, the speech recognition apparatus 1100 may further include a memory 1140 that stores the acoustic model and the language model.

When it is determined that the speech signal for uttering the activation word has been received, the processor 1120 may perform speech recognition on the input audio signal including the speech signal for uttering the activation word.

The processor 1120 may receive and store the input audio signal prior to performing speech recognition. The processor 1120 may determine whether the input audio signal includes the speech signal for uttering the activation word. When it is determined that the input audio signal includes the speech signal for uttering the activation word included in the at least one activation word, the processor 1120 may perform speech recognition on the stored input audio signal and a subsequently received input audio signal.

The processor 1120 may determine whether to output a result of performing speech recognition immediately or to output the result of performing speech recognition when a confirmation command is received from the user. The processor 1120 may extract text uttered by the user by performing speech recognition on the input audio signal. The processor 1120 may determine whether a speech command included in the input audio signal is a direct command for requesting a response of the speech recognition apparatus, based on natural language understanding and sentence analysis of the extracted text.

The processor 1120 may perform an operation of responding to the speech command when it is determined that the speech command is the direct command. The processor 1120 may control the outputter 1130 to display that the response to the speech command is possible when it is determined that the speech command is not the direct command. The processor 1120 may perform the operation of responding to the speech command when a confirmation command is received from the user through the receiver 1110.

The processor 1120 according to an embodiment may be implemented with hardware and/or software components that perform particular functions. For example, the processor 1120 may include a user situation analyzer (not shown) for analyzing a situation in which the speech recognition apparatus 100 operates, a candidate activation word extractor (not shown) for extracting candidate activation words corresponding to a current situation from a database, an activation word switcher (not shown) for switching an activation word according to the current situation, and an audio signal processer (not shown) for processing an audio signal including a speech command for uttering the activation word.

The functions performed by the processor 1120 may be implemented by at least one microprocessor, or by circuit components for related functions. Some or all of the functions performed by the processor 1120 may be implemented by software modules configured in various programming languages or script languages that are executed in the processor 1120. FIGS. 11A and 11B illustrate that the speech recognition apparatus 100 includes one processor 1120, but the embodiment is not limited thereto. The speech recognition apparatus 100 may include a plurality of processors.

The outputter 1130 according to an embodiment may output a result of speech recognition performed on the input audio signal. The outputter 1130 may inform the user of the result of performing speech recognition or transmit the result to an external device (e.g., a smart phone, a smart TV, a smart watch, a server, etc.). For example, the outputter 1130 may include a speaker or a display capable of outputting an audio signal or a video signal.

Alternatively, the outputter 1130 may perform an operation corresponding to the result of performing speech recognition. For example, the speech recognition apparatus 100 may determine a function of the speech recognition apparatus 100 corresponding to the result of performing speech recognition, and may output a screen performing the function through the outputter 1130. Alternatively, the speech recognition apparatus 100 may transmit a keyword corresponding to the result of performing speech recognition to an external server, receive information related to the transmitted keyword from the server, and output the information on the screen through the outputter 1130.

The outputter 1130 may output information that is received from outside, is processed by the processor 1120, or is stored in the form of at least one of light, sound, image, and vibration. For example, the outputter 1130 may further include at least one of a display for outputting text or an image, an acoustic outputter for outputting sound, and a vibration motor for outputting vibration.

The memory 1140 of FIG. 11B may store the result of speech recognition performed by the processor 1120. The memory 1140 may store the input audio signal received through the receiver 1110. The memory 1140 may receive and store the input audio signal in units of a sentence, in units of a predetermined time length, or in units of a predetermined data size.

The memory 1140 may store instructions that are executed in the processor 1120 to control the speech recognition apparatus 100.

The memory 1140 according to an embodiment may store a database including a plurality of candidate activation words respectively corresponding to a plurality of situations. The processor 1120 may retrieve at least one candidate activation word corresponding to a situation in which the speech recognition apparatus 100 operates from data stored in memory 1140 in determining the at least one activation word. The processor 1120 may determine at least one of the retrieved candidate activation words as an activation word.

The memory 1140 may include a database including information about a sentence structure and grammar. The processor 1120 may determine whether the speech command included in the input audio signal is a direct command by using the information about the sentence structure and grammar stored in the memory 1140.

The memory 1140 may include at least one type storage medium of a flash memory type, a hard disk type, a multimedia card micro type, a card type memory (for example, secure digital (SD) or extreme digital (XD) A random access memory (SRAM), a read only memory (ROM), an electrically erasable programmable read-only memory (EEPROM), a programmable read-only memory (PROM), magnetic disk, magnetic disk, magnetic disk, or optical disk.

The user inputter 1150 according to an embodiment may receive a user input for controlling the speech recognition apparatus 100. The user inputter 1150 may include a user input device including a touch panel for receiving a touch of the user, a button for receiving a push operation of a user, a wheel for receiving a rotation operation of the user, a key board, a dome switch, etc. but is not limited thereto.

The communicator 1160 may communicate with an external electronic apparatus or server through wired communication or wireless communication. For example, the communicator 1160 may communicate with the server that stores a database including candidate activation words suitable for each situation with respect to a plurality of situations. The communicator 1160 may retrieve and extract at least one candidate activation word suitable for a current situation from the server. The processor 1120 may determine at least one of the retrieved candidate activation words as an activation word.

The communicator 1160 may acquire information related to a situation in which the speech recognition apparatus 100 operates from the external electronic apparatus. The communicator 1160 may acquire information sensed by the external electronic apparatus as the information related to the situation in which the speech recognition apparatus 100 operates.

The communicator 1160 may communicate with a server that performs a speech recognition function. For example, the communicator 1160 may transmit an audio signal including a sentence including an activation word to the server. The communicator 1160 may receive a result of speech recognition performed by the server.

The communicator 1160 may include a near distance communication module, a wired communication module, a mobile communication module, a broadcast receiving module, and the like.

The sensing unit 1170 may include one or more sensors and sense various information used to determine a situation in which the speech recognition apparatus 100 operates. For example, the sensing unit 1170 may sense a location of the speech recognition apparatus 100, information related to a motion of the speech recognition apparatus 100, information that may identify a user who uses the speech recognition apparatus 100, surrounding environment information of the speech recognition apparatus 100, and the like.

The sensing unit 1170 may include at least one of an illuminance sensor, a biosensor, a tilt sensor, a position sensor, a proximity sensor, a geomagnetism sensor, a gyroscope sensor, a temperature/humidity sensor, an infrared ray sensor, and a speed/acceleration sensor or a combination thereof.

The block diagrams shown in FIGS. 11A and 11B may also be applied to a speech recognition server. The speech recognition server may include a receiver for receiving an input audio signal from the speech recognition apparatus. The speech recognition server may be connected to the speech recognition apparatus by wired or wirelessly.

Also, the speech recognition server may include a processor and an outputter, and may further include a memory and a communicator. The processor of the speech recognition server may detect a speech signal from an input audio signal and perform speech recognition on the speech signal.

The outputter of the speech recognition server may transmit a result of performing speech recognition to the speech recognition apparatus. The speech recognition apparatus may output the result of performing speech recognition received from the speech recognition server.

The above-described embodiments may be implemented in a general-purpose digital computer that may be created as a program that may be executed in a computer and operates the program using a medium readable by a computer. Further, the structure of the data used in the above-described embodiments may be recorded on the computer-readable medium through various means. Furthermore, the above-described embodiments may be embodied in the form of a recording medium including instructions executable by a computer, such as a program module, executed by a computer. For example, methods implemented with software modules or algorithms may be stored in computer readable media as code or program instructions that may be read and executed by the computer.

The one or more embodiments of the present disclosure may be written as computer programs and may be implemented in general-use digital computers that execute the programs using a non-transitory computer-readable recording medium. In addition, a data structure used in the embodiments of the present disclosure may be written in a non-transitory computer-readable recording medium through various means. The one or more embodiments may be embodied as computer readable code/instructions on a recording medium, e.g., a program module to be executed in computers, which include computer-readable commands. For example, methods that are implemented as software modules or algorithms may be stored as computer readable codes or program instructions executable on a non-transitory computer-readable recording medium.

The computer-readable medium may include any recording medium that may be accessed by computers, volatile and non-volatile medium, and detachable and non-detachable medium. Examples of the computer-readable medium include, but are not limited to, magnetic storage media (e.g., ROM, floppy disks, hard disks, etc.), optical recording media (e.g., compact disc read-only memory (CD-ROMs), or digital versatile discs (DVDs)), etc. In addition, the computer-readable medium may include a computer storage medium.

The non-transitory computer-readable recording media may be distributed over network coupled computer systems, and data stored in the distributed recording media, e.g., a program command and code, may be executed by using at least one computer.

The particular executions described in the present disclosure are by way of example only and are not intended to limit the scope of the present disclosure in any way. For brevity of description, descriptions of various electronic components, control systems, software, and other functional aspects of the systems may be omitted according to the related art.

The terms "unit", "module", etc. as used herein mean a unit for processing at least one function or operation, which may be implemented in hardware or software or a combination of hardware and software. The terms "unit" and "module" may be implemented by a program stored on an addressable storage medium and executable by a processor.

For example, "unit" and "module" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

It should be understood that embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A speech recognition method comprising:
   storing a plurality of activation words for activating speech recognition respectively corresponding to a plurality of operating environments, the activation words being terms related to each of the operating environments and being terms that can be included in a sentence to trigger the speech recognition;
   determining, by a processor of a speech recognition apparatus, at least one activation word among the plurality of activation words based on information related to the operating environment in which the speech recognition apparatus is operating;

receiving, at the speech recognition apparatus, an input audio signal;

performing, by the processor, speech recognition on the input audio signal, based on whether the input audio signal includes an activation word included in the at least one activation word determined and whether the input audio signal includes a direct command for requesting a response of the speech recognition apparatus; and outputting a result of the performing of the speech recognition, wherein the outputting of the result of performing the speech recognition comprises:
extracting text uttered by a user by performing speech recognition on the input audio signal,
determining whether a speech command included in the input audio signal is the direct command,
when it is determined that the speech command is the direct command, performing an operation of responding to the speech command, and
when it is determined that the speech command is an indirect command:
displaying that a response to the speech command is possible and waiting for a confirmation command, and
in response to detecting the confirmation command from the user, performing the operation of responding to the speech command, wherein the at least one activation word corresponds to executable functions of the speech recognition apparatus, wherein the direct command is speech uttered by a user with an intent for the speech recognition apparatus to output the result of the performing of the speech recognition, wherein the indirect command is speech uttered by the user such that the speech recognition apparatus is unable to determine that the user intends for the speech recognition apparatus to output the result of the performing of the speech recognition, wherein the information related to the environment comprises at least one of a time, a location of the speech recognition apparatus identified according to a type of a network to which the speech recognition apparatus is connected, and whether the speech recognition apparatus is connected to another electronic apparatus, and wherein the direct command is determined based on at least one of a sentence ending in the speech signal, an intonation of the speech signal, a direction in which the speech signal is received, or a size of the speech signal.

2. The speech recognition method of claim 1, wherein the determining of the at least one activation word comprises determining a number of the at least one activation word, based on a degree of sensitivity of an activated speech recognition function of the speech recognition apparatus.

3. The speech recognition method of claim 1,
wherein the receiving of the input audio signal comprises storing the input audio signal, and
wherein the performing of speech recognition comprises:
determining whether the input audio signal comprises the speech signal for uttering the activation word included in the at least one activation word, and
when it is determined that the input audio signal comprises the speech signal for uttering the activation word included in the at least one activation word, performing speech recognition on the stored input audio signal and a subsequently received input audio signal.

4. The speech recognition method of claim 1, wherein the performing of the speech recognition comprises performing speech recognition on the input audio signal comprising the speech signal for uttering the activation word included in the at least one activation word.

5. The speech recognition method of claim 1, wherein the outputting of the result of performing the speech recognition comprises determining whether to output the result of performing the speech recognition immediately or whether to output the result of performing the speech recognition if a confirmation command is received from a user.

6. The speech recognition method of claim 1, further comprising:
receiving information about speech commands received from a user in a plurality of situations, wherein the receiving is performed by the speech recognition apparatus;
extracting a plurality of words included in the speech commands; and
based on a frequency of the plurality of words included in speech commands received in a specific situation among the plurality of situations, storing at least one word as an activation word corresponding to the specific situation.

7. The speech recognition method of claim 1, wherein the determining of the at least one activation word comprises:
obtaining information about at least one electronic apparatus connected to the speech recognition apparatus; and
determining a word related to the at least one electronic apparatus as the at least one activation word.

8. A speech recognition apparatus comprising:
a receiver configured to receive an input audio signal; and
at least one processor configured to:
store a plurality of activation words for activating speech recognition respectively corresponding to a plurality of operating environments, the activation words being terms related to each of the operating environments and being terms that can be included in a sentence to trigger the speech recognition,
determine at least one activation word comprising activation words among the plurality of activation words based on information related to the environment in which a speech recognition apparatus is operating,
perform speech recognition on the input audio signal, based on whether the input audio signal includes an activation word included in the at least one activation word determined and whether the input audio signal includes a direct command for requesting a response of the speech recognition apparatus, and
output a result of the speech recognition,
wherein the outputting of the result of performing the speech recognition comprises:
extracting text uttered by a user by performing speech recognition on the input audio signal,
determining whether a speech command included in the input audio signal is the direct command,
when it is determined that the speech command is the direct command, performing an operation of responding to the speech command, and
when it is determined that the speech command is an indirect command:

displaying that a response to the speech command is possible and waiting for a confirmation command, and in response to detecting the confirmation command from the user, performing the operation of responding to the speech command, wherein the at least one activation word corresponds to executable functions of the speech recognition apparatus, wherein the direct command is speech uttered by a user with an intent for the speech recognition apparatus to output the result of the performing of the speech recognition, wherein the indirect command is speech uttered by the user such that the speech recognition apparatus is unable to determine that the user intends for the speech recognition apparatus to output the result of the performing of the speech recognition, wherein the information related to the environment comprises at least one of a time, a location of the speech recognition apparatus identified according to a type of a network to which the speech recognition apparatus is connected, and whether the speech recognition apparatus is connected to another electronic apparatus, and wherein the direct command is determined based on at least one of a sentence ending in the speech signal, an intonation of the speech signal, a direction in which the speech signal is received, or a size of the speech signal.

9. The speech recognition apparatus of claim 8, wherein, in the determining of the at least one activation word, the at least one processor is further configured to determine a number of the at least one activation word, based on a degree of sensitivity of an activated speech recognition function of the speech recognition apparatus.

10. The speech recognition apparatus of claim 8, further comprising:
a memory configured to store the input audio signal,
wherein, in the performing of the speech recognition, the at least one processor is further configured to:
determine whether the input audio signal comprises the speech signal for uttering the activation word included in the at least one activation word, and
when it is determined that the input audio signal comprises the speech signal for uttering the activation word included in the at least one activation word, perform speech recognition on the stored input audio signal and a subsequently received input audio signal.

11. The speech recognition apparatus of claim 8, wherein, in the performing of the speech recognition, the at least one processor is further configured to perform speech recognition on the input audio signal comprising the speech signal for uttering the activation word included in the at least one activation word.

12. The speech recognition apparatus of claim 8, wherein the at least one processor is further configured to determine whether to output the result of performing the speech recognition immediately or whether to output the result of performing the speech recognition if a confirmation command is received from a user.

13. The speech recognition apparatus of claim 8, wherein the at least one processor is further configured to:
extract text uttered by a user by performing speech recognition on the input audio signal,
determine whether a speech command included in the input audio signal is the direct command, and
when it is determined that the speech command is the direct command, perform an operation responding to the speech command.

14. A non-transitory computer-readable recording medium having recorded thereon at least one program comprising instructions for allowing a speech recognition apparatus to execute a speech recognition method, the speech recognition method comprising:
determining at least one activation word comprising activation words among a plurality of activation words based on information related to the environment in which a speech recognition apparatus is operating, the activation words being terms related to each of the operating environments and being terms that can be included in a sentence to trigger the speech recognition;
receiving an input audio signal;
performing speech recognition on the input audio signal, based on whether the input audio signal includes an activation word included in the at least one activation word determined has been included in the input audio signal and whether the input audio signal includes a direct command for requesting a response of the speech recognition apparatus; and
outputting a result of the performing of the speech recognition,
wherein the outputting of the result of performing the speech recognition comprises:
extracting text uttered by a user by performing speech recognition on the input audio signal,
determining whether a speech command included in the input audio signal is the direct command,
when it is determined that the speech command is the direct command, performing an operation of responding to the speech command,
when it is determined that the speech command is an indirect command:
displaying that a response to the speech command is possible and waiting for a confirmation command, and
in response to detecting the confirmation command from the user, performing the operation of responding to the speech command,
wherein the at least one activation word corresponds to executable functions of the speech recognition apparatus,
wherein the direct command is speech uttered by a user with an intent for the speech recognition apparatus to output the result of the performing of the speech recognition,
wherein the information related to the environment comprises at least one of a time, a location of the speech recognition apparatus identified according to a type of a network to which the speech recognition apparatus is connected, and whether the speech recognition apparatus is connected to another electronic apparatus, and
wherein the direct command is determined based on at least one of a sentence ending in the speech signal, an intonation of the speech signal, a direction in which the speech signal is received, or a size of the speech signal.

* * * * *